(12) United States Patent
Tischler et al.

(10) Patent No.: US 12,504,163 B1
(45) Date of Patent: Dec. 23, 2025

(54) LIGHTING SYSTEMS INCORPORATING ACOUSTIC APERTURES

(71) Applicants: Michael A. Tischler, Surrey (CA); Paul Palfreyman, Vancouver (CA)

(72) Inventors: Michael A. Tischler, Surrey (CA); Paul Palfreyman, Vancouver (CA)

(73) Assignee: COOLEDGE LIGHTING INC., Richmond, CA (US)

( * ) Notice: Subject to any disclaimer, the term of this patent is extended or adjusted under 35 U.S.C. 154(b) by 683 days.

(21) Appl. No.: 17/747,065

(22) Filed: May 18, 2022

Related U.S. Application Data

(63) Continuation-in-part of application No. 17/673,001, filed on Feb. 16, 2022, now Pat. No. 11,692,702, which is a continuation of application No. 16/923,258, filed on Jul. 8, 2020, now Pat. No. 11,274,823, which is a continuation-in-part of application No. 16/455,863, filed on Jun. 28, 2019, now Pat. No. 10,746,358, which is a continuation-in-part of application No. 15/446,494, filed on Mar. 1, 2017, now Pat. No. 10,344,954.

(60) Provisional application No. 63/194,237, filed on May 28, 2021, provisional application No. 62/302,434, filed on Mar. 2, 2016.

(51) Int. Cl.
    *F21V 33/00* (2006.01)
    *E04B 1/84* (2006.01)
    *F21S 8/04* (2006.01)
    *F21Y 105/16* (2016.01)
    *F21Y 115/10* (2016.01)

(52) U.S. Cl.
    CPC ........ *F21V 33/0056* (2013.01); *E04B 1/8409* (2013.01); *F21S 8/04* (2013.01); *F21Y 2105/16* (2016.08); *F21Y 2115/10* (2016.08)

(58) Field of Classification Search
    CPC .................. F21Y 2105/16; F21V 33/0056
    See application file for complete search history.

(56) References Cited

U.S. PATENT DOCUMENTS

| | | | | |
|---|---|---|---|---|
| 3,253,675 | A * | 5/1966 | Baruch | F21V 33/006 181/289 |
| 2012/0327651 | A1* | 12/2012 | Cornelssen | F21S 8/033 362/231 |
| 2013/0148357 | A1* | 6/2013 | Johnston | F21V 33/006 362/253 |
| 2015/0109765 | A1* | 4/2015 | Sepkhanov | F21V 11/14 362/147 |
| 2016/0186942 | A1* | 6/2016 | De Gier | F21V 33/006 362/253 |
| 2018/0135840 | A1* | 5/2018 | Golle | F21V 21/35 |
| 2019/0390458 | A1* | 12/2019 | Steinel | F21V 33/0056 |
| 2021/0025567 | A1* | 1/2021 | Van Delden | F21V 1/00 |
| 2021/0190278 | A1* | 6/2021 | Bartella | F21S 8/026 |
| 2021/0248988 | A1* | 8/2021 | Simla | G10K 11/172 |

* cited by examiner

*Primary Examiner* — Alexander K Garlen

(74) *Attorney, Agent, or Firm* — Morgan, Lewis & Bockius LLP

(57) ABSTRACT

In accordance with various embodiments, lighting systems feature one or more panels each having multiple light-emitting elements thereon and one or more acoustic apertures. One or more of the panels may include sound-absorbing material therebelow and the light-emitting elements may be spaced apart to reveal the sound-absorbing material.

28 Claims, 29 Drawing Sheets

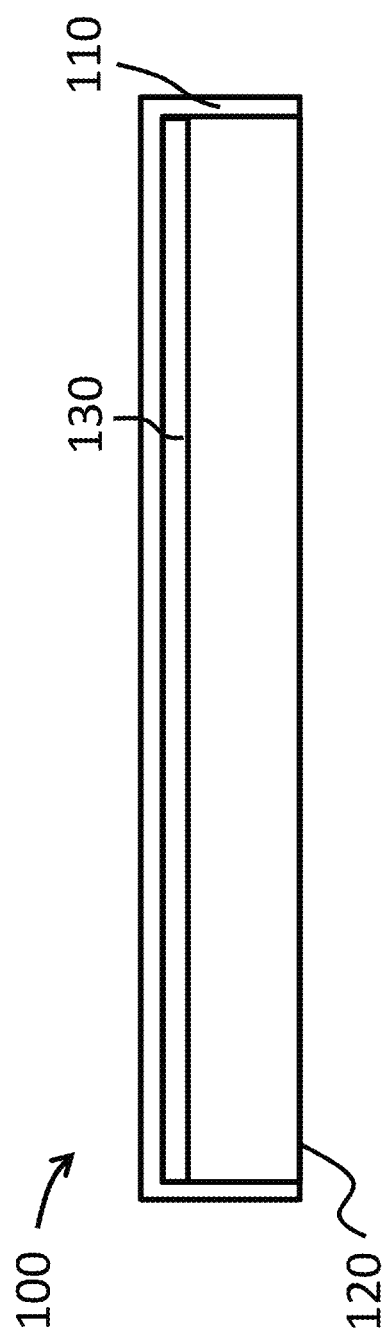

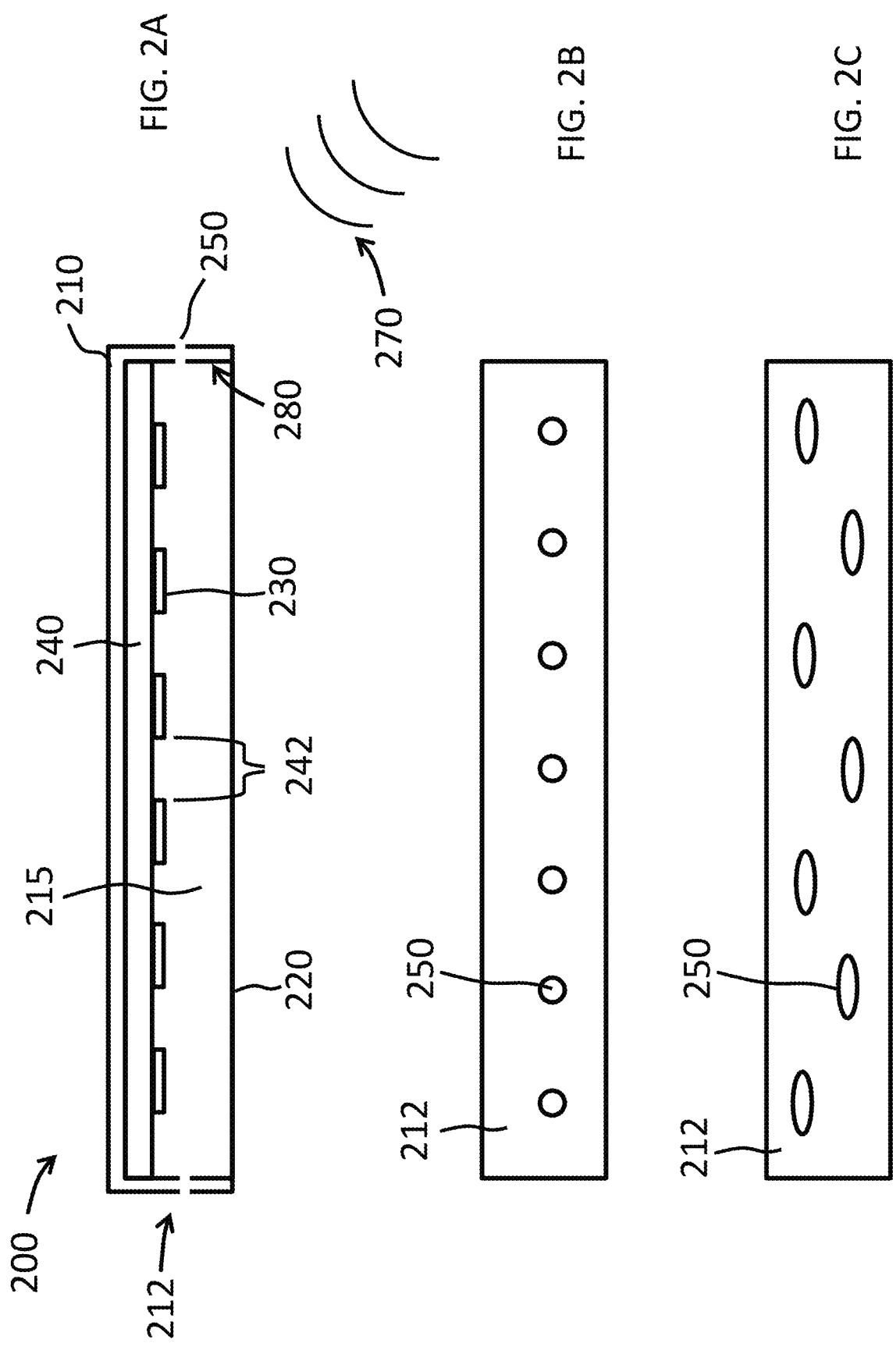

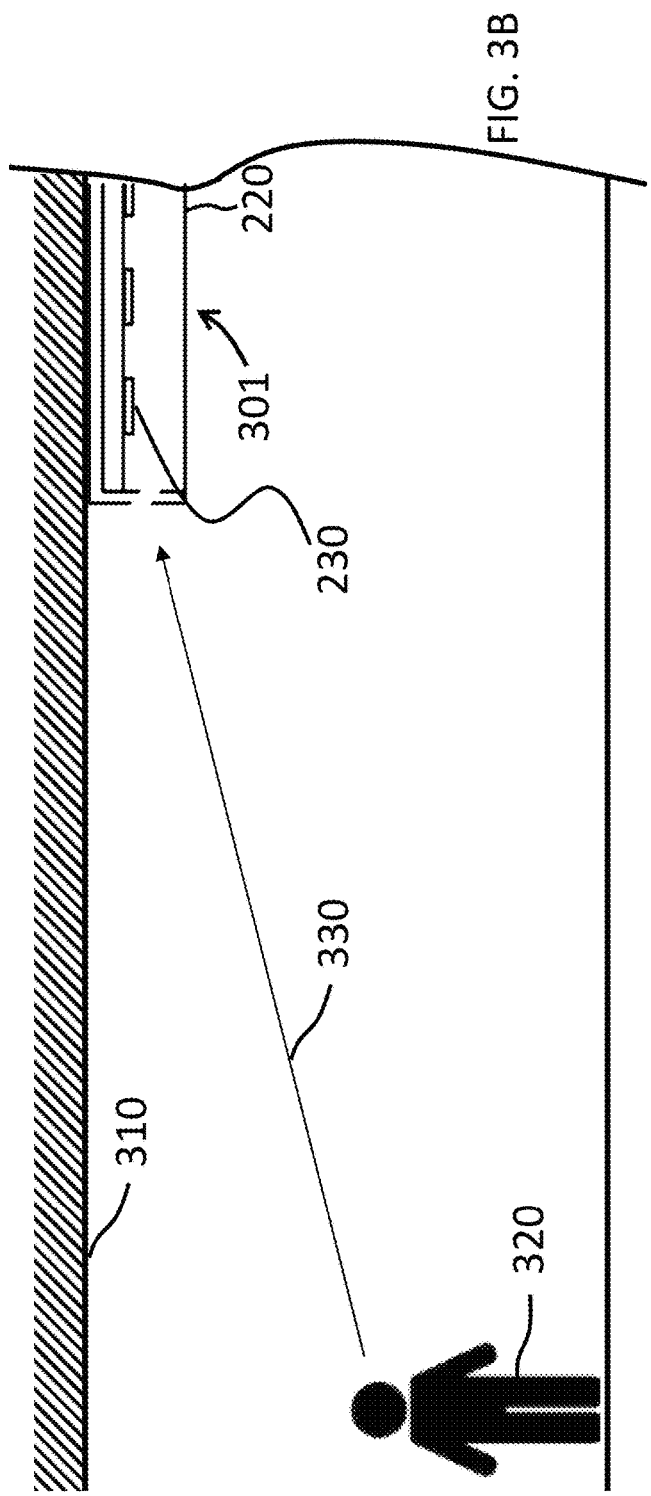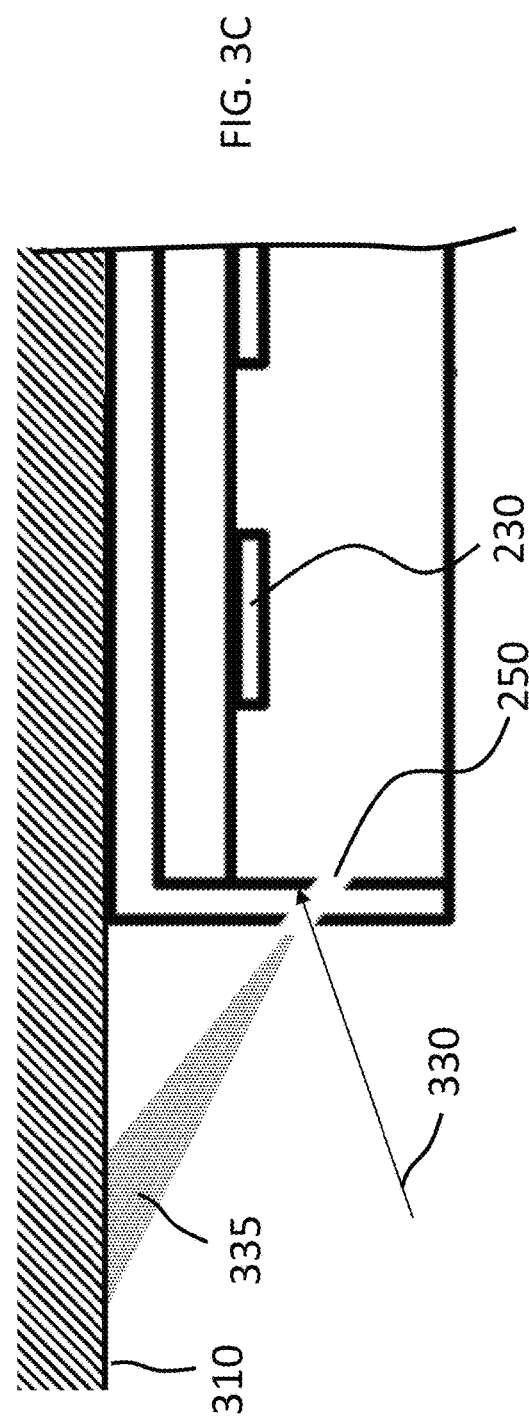

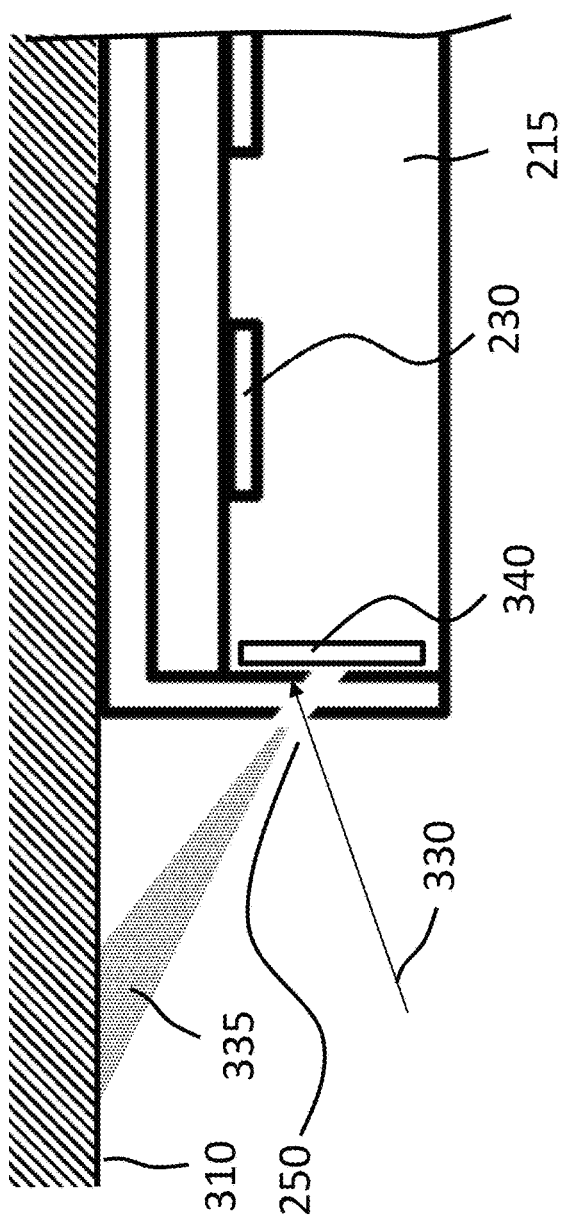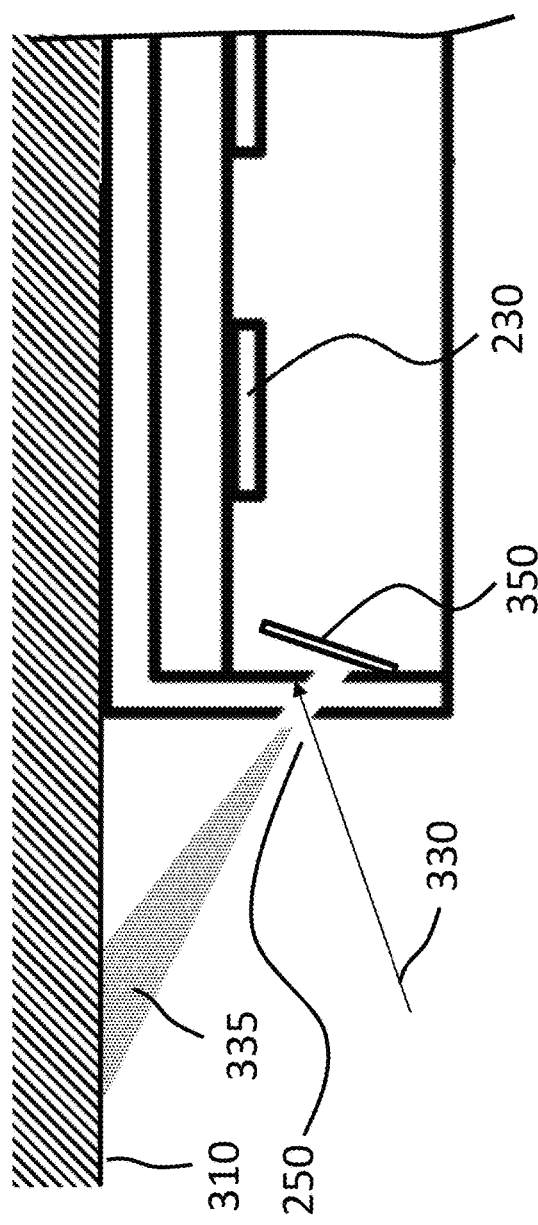

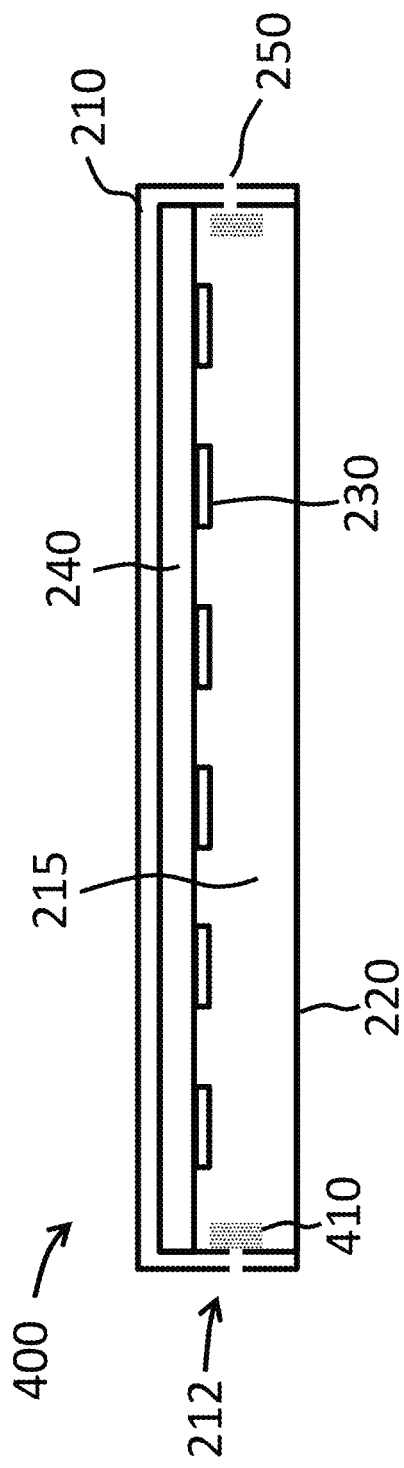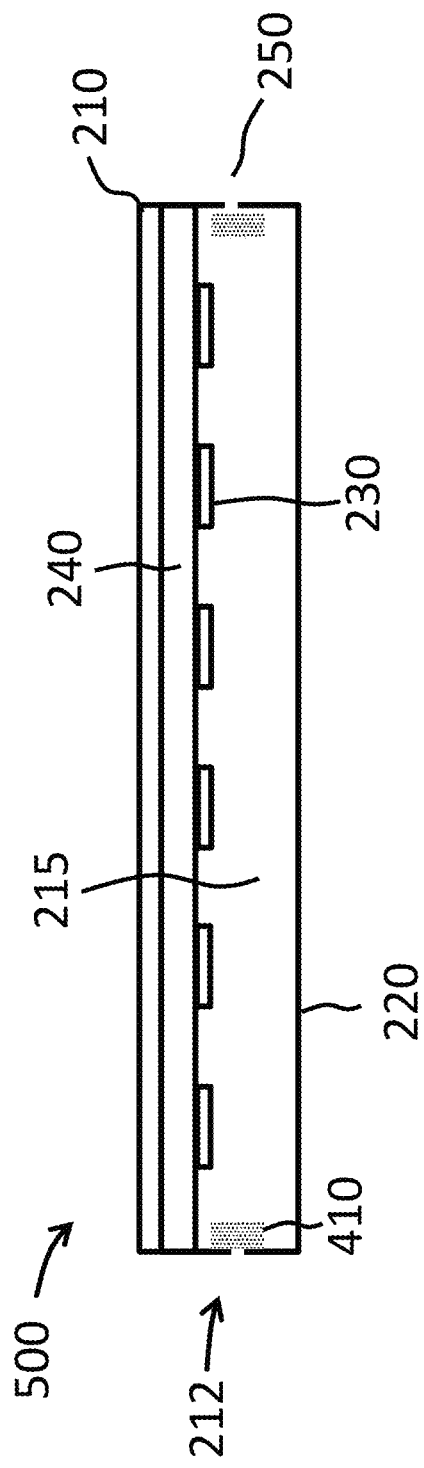

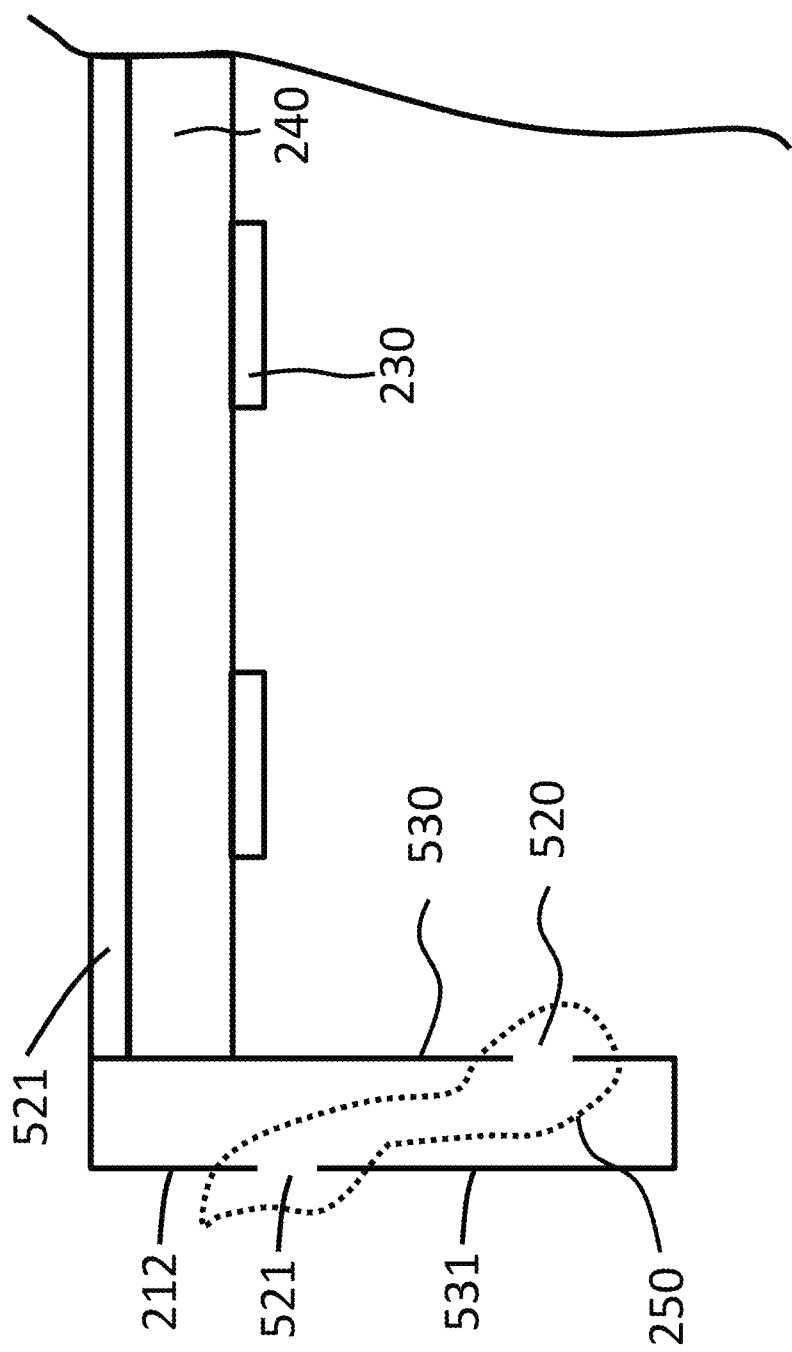

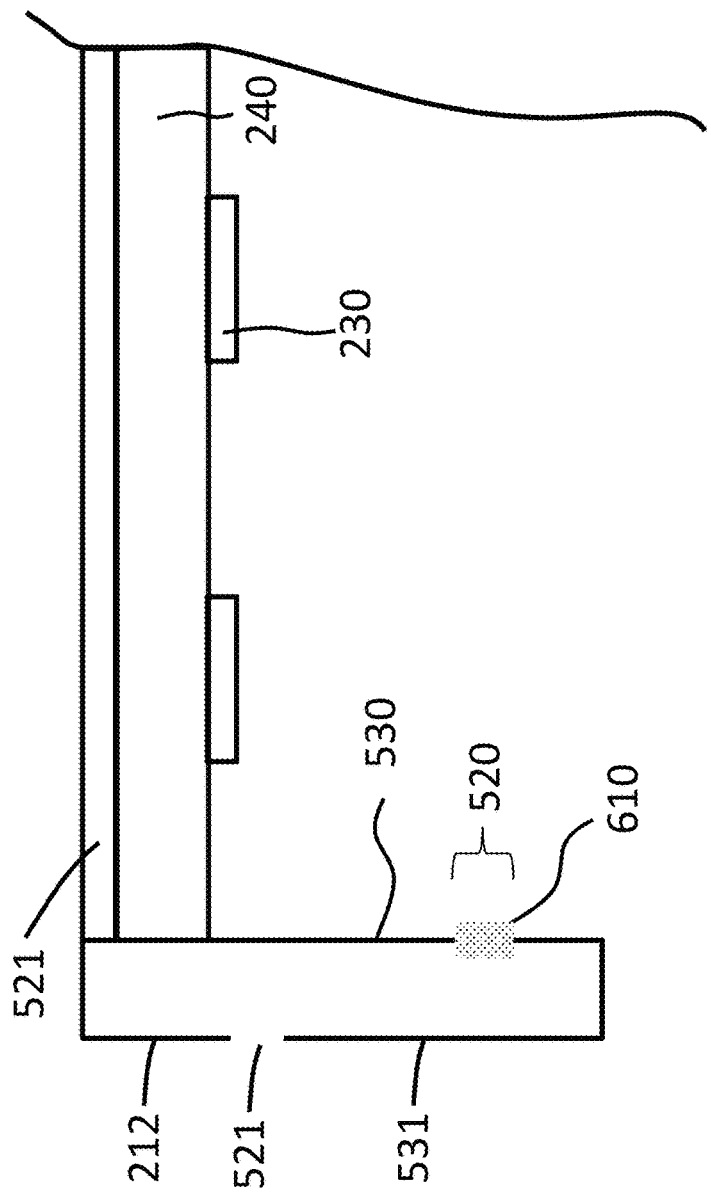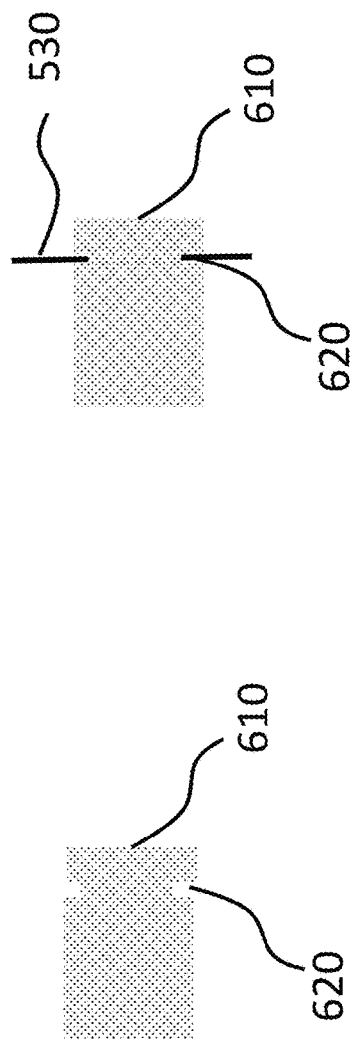

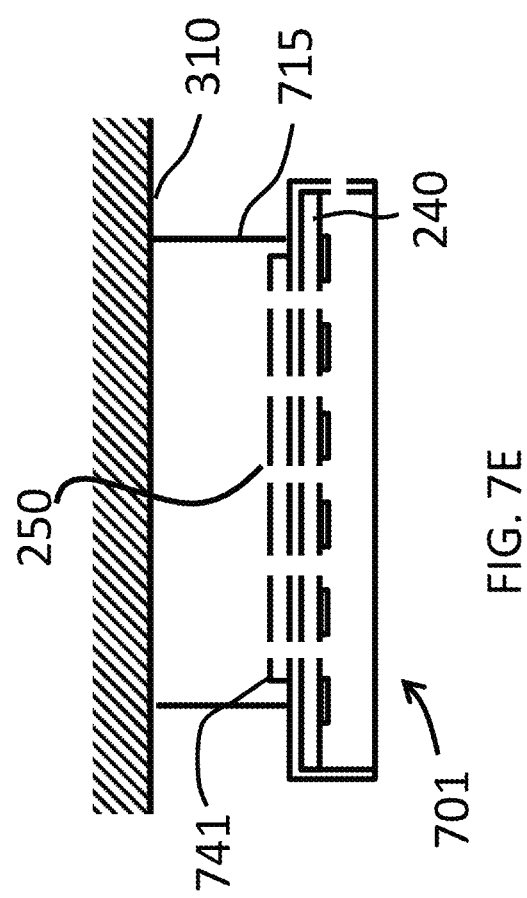

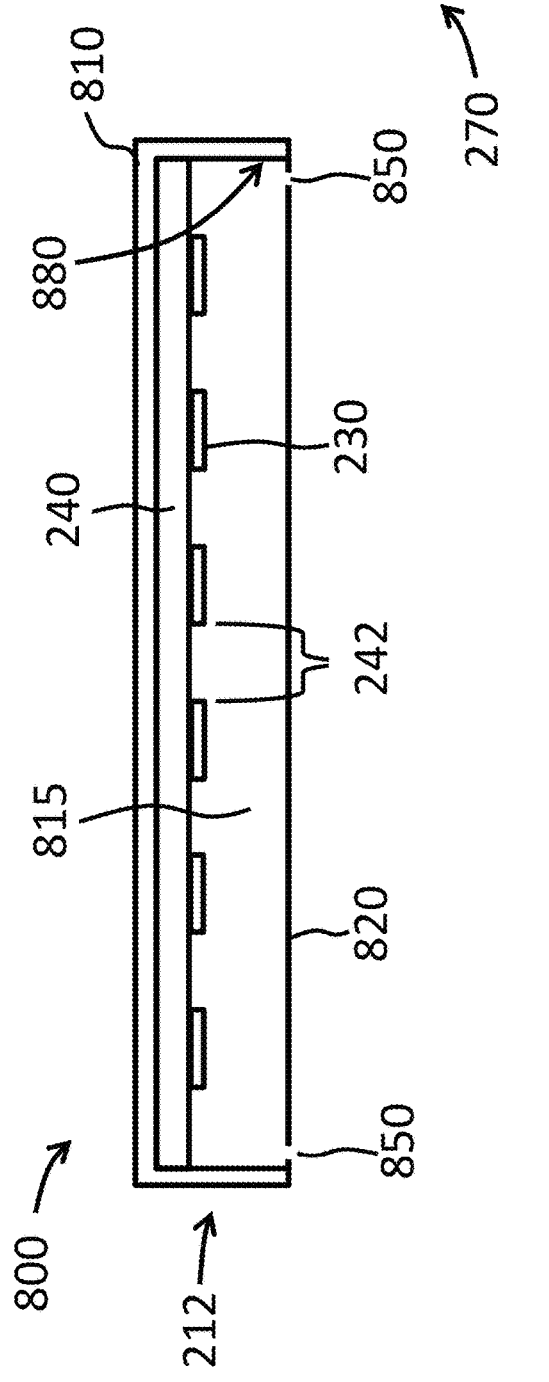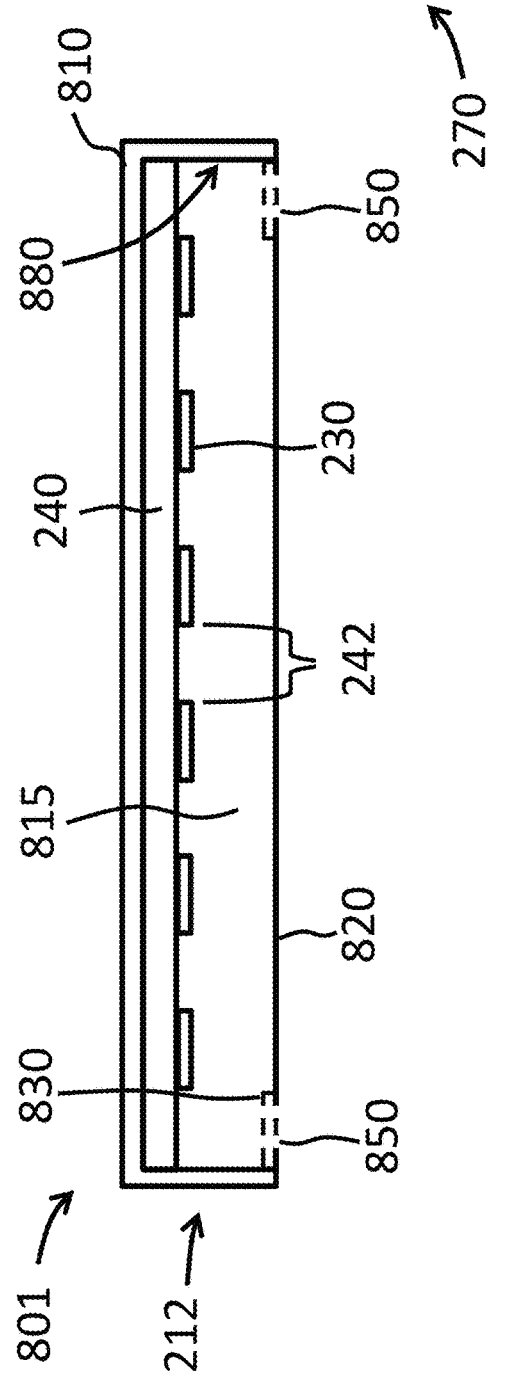

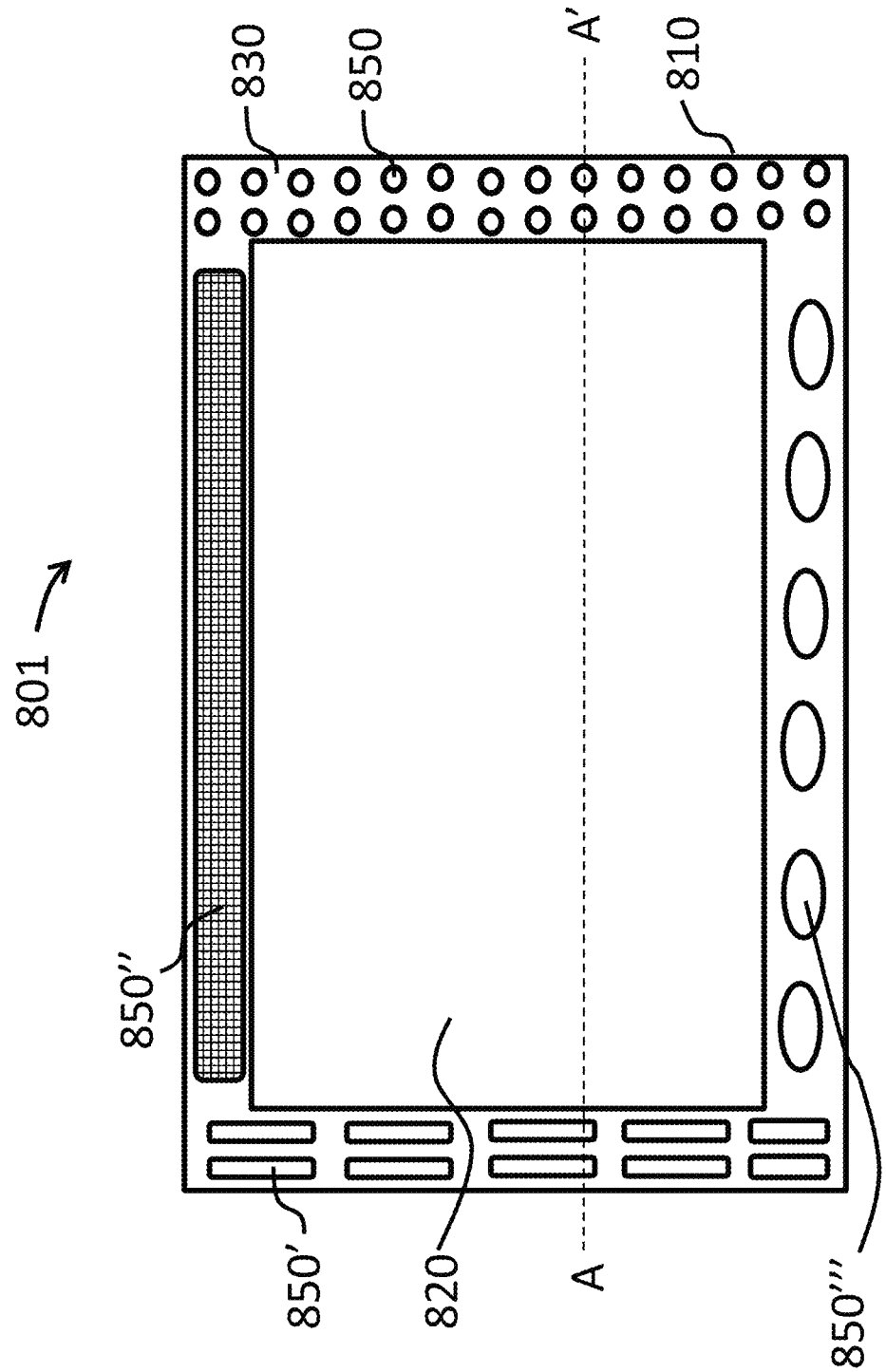

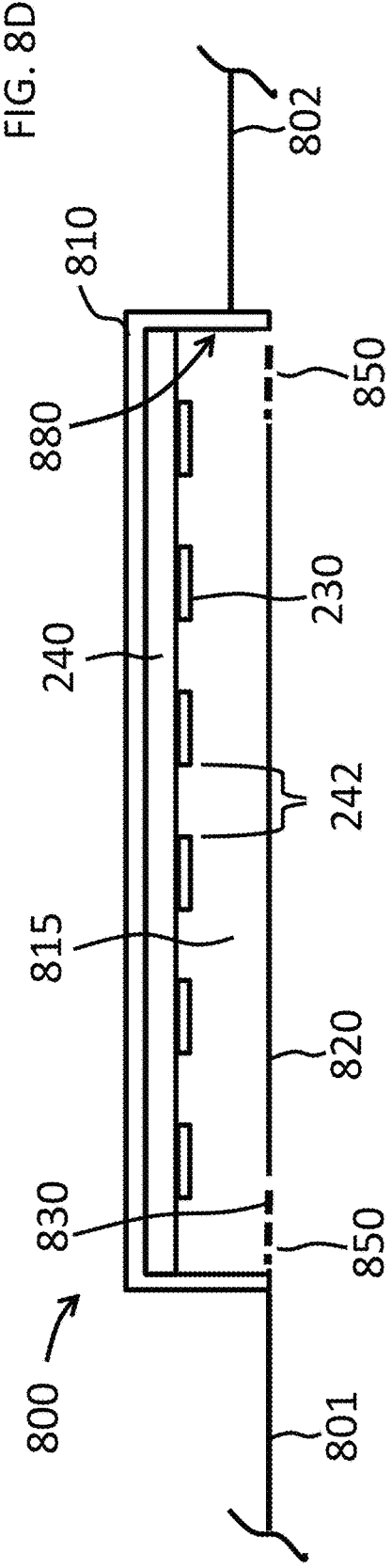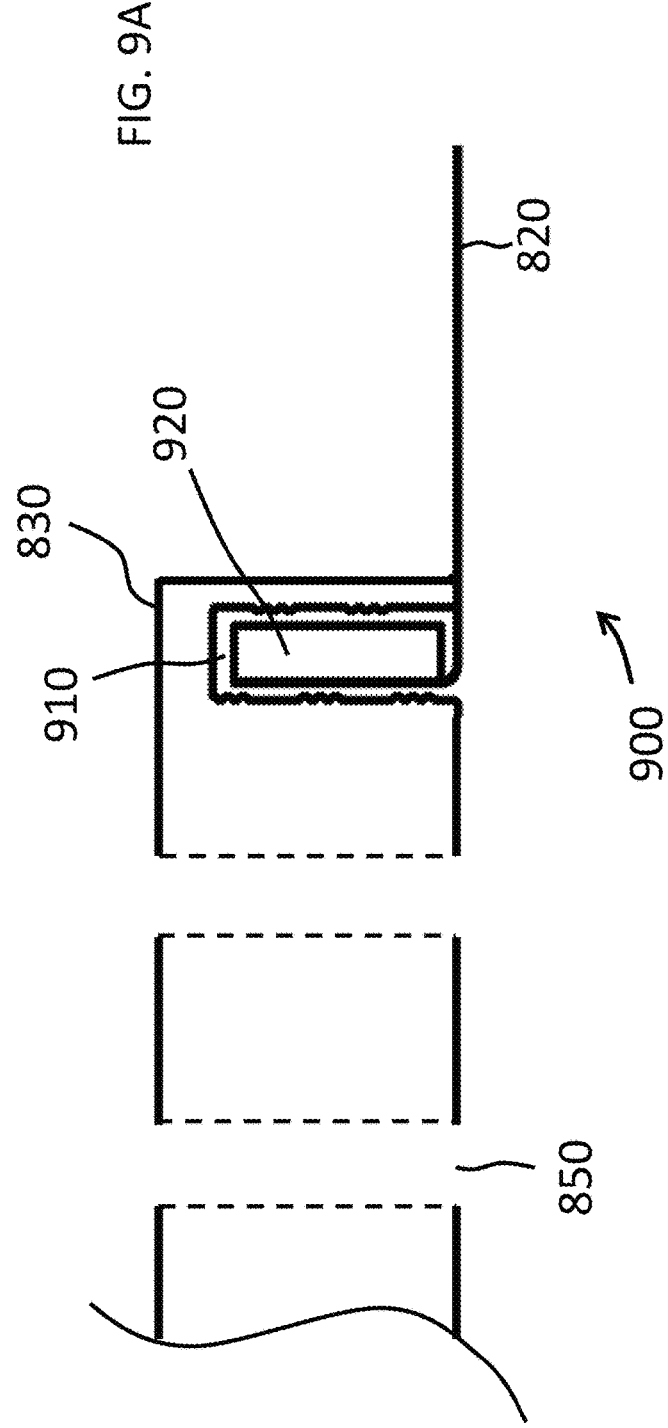

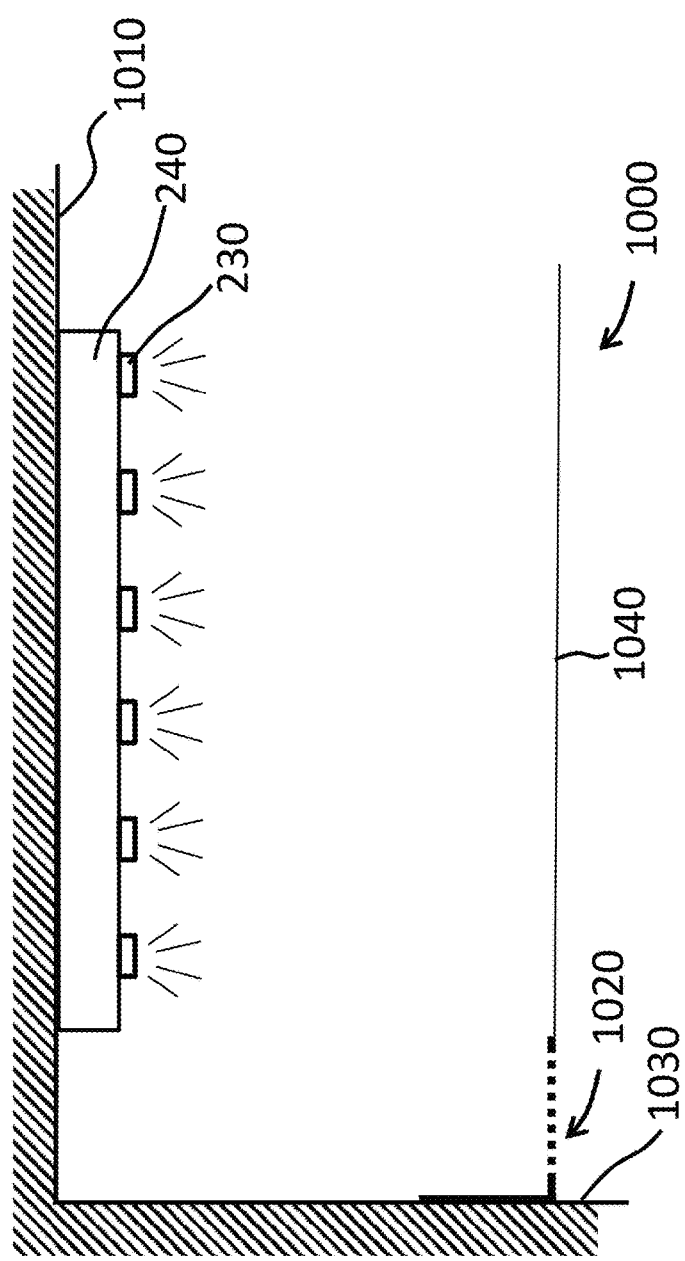

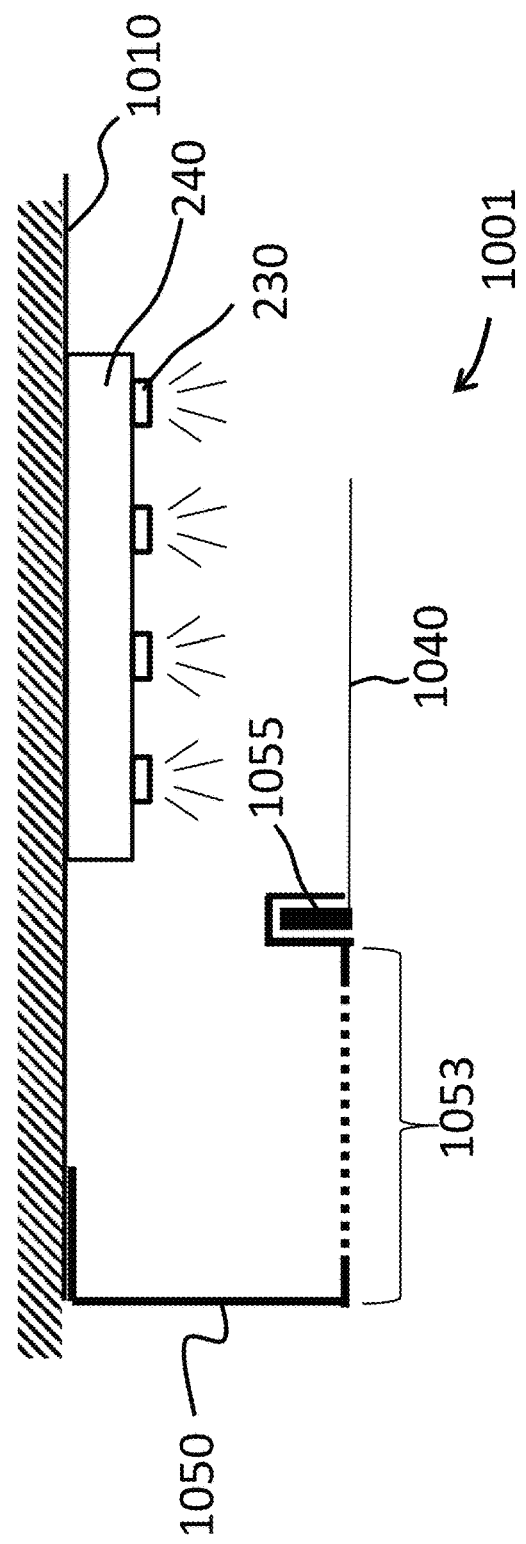

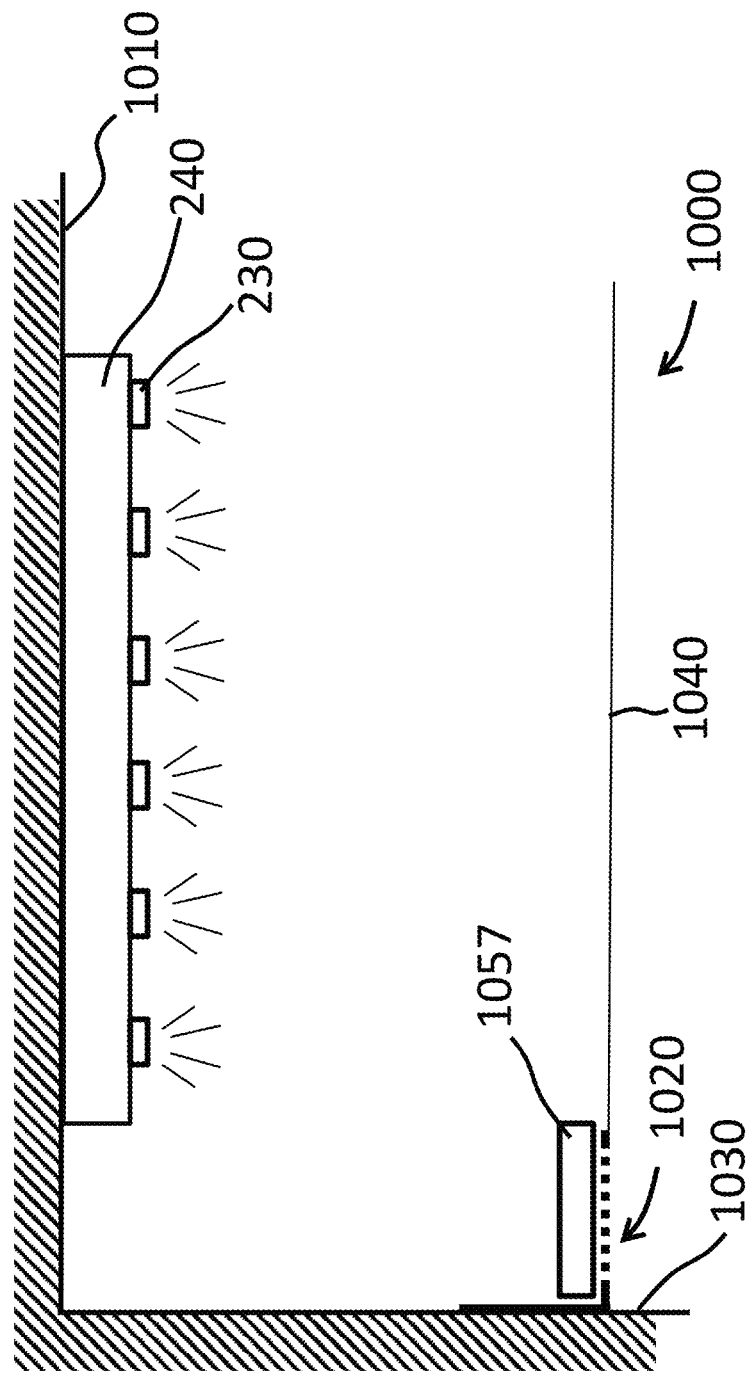

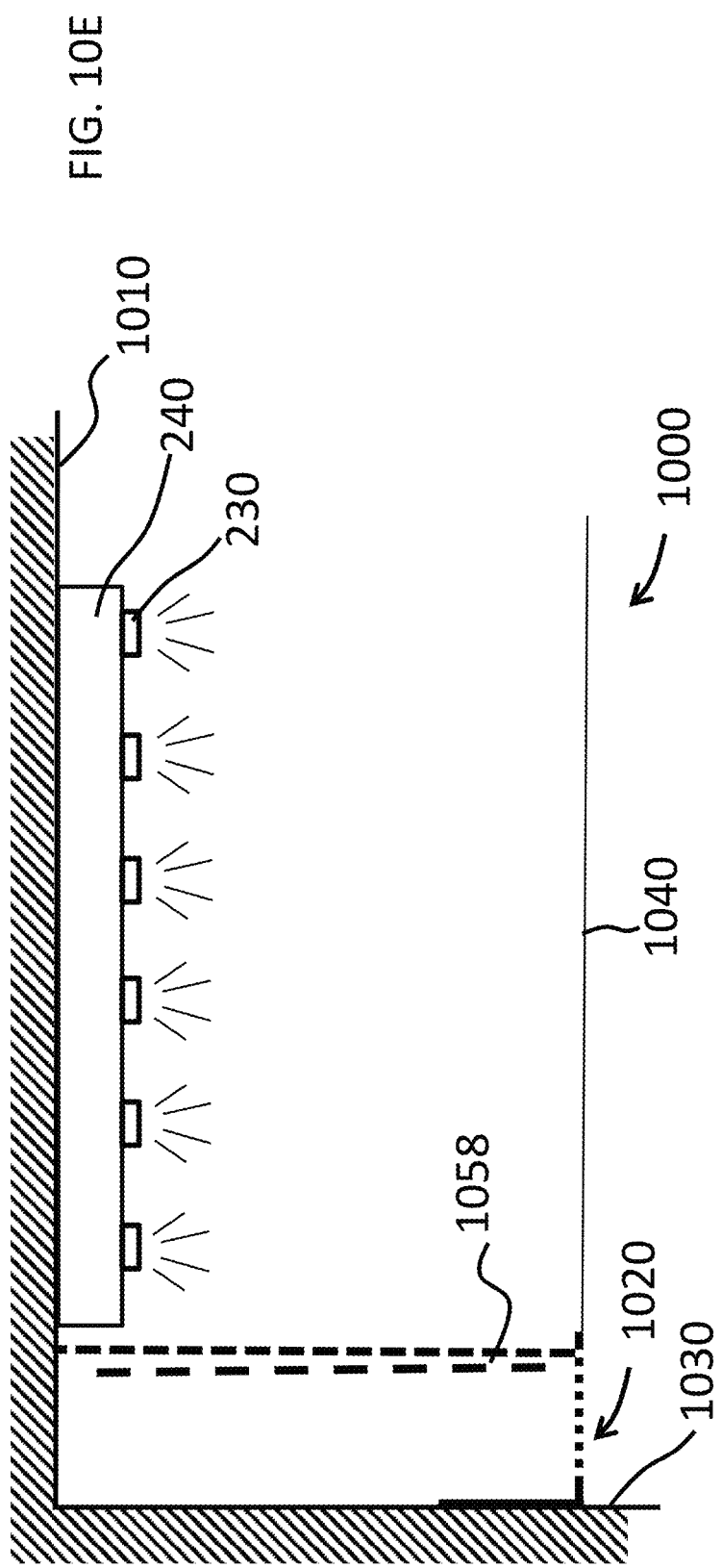

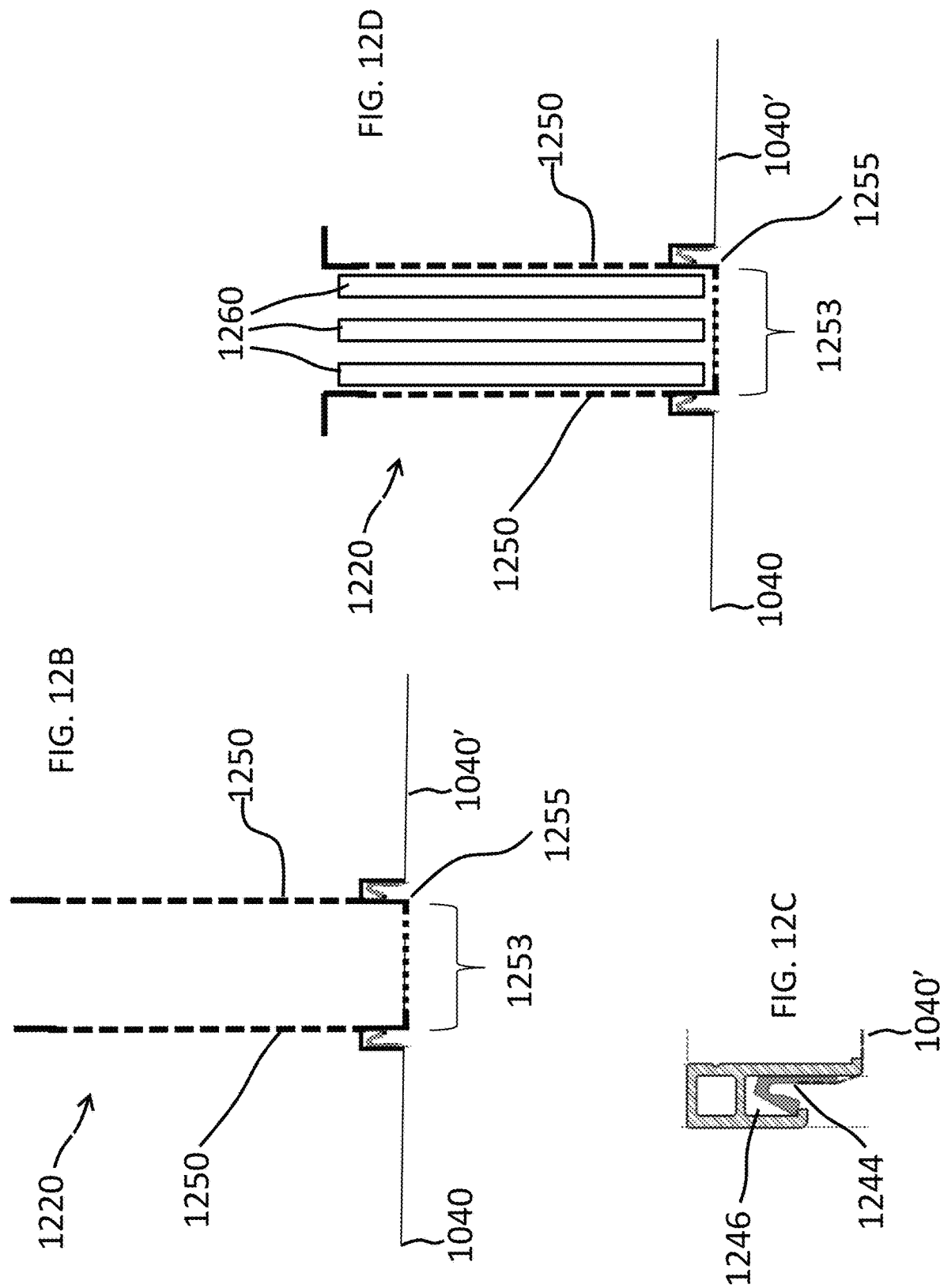

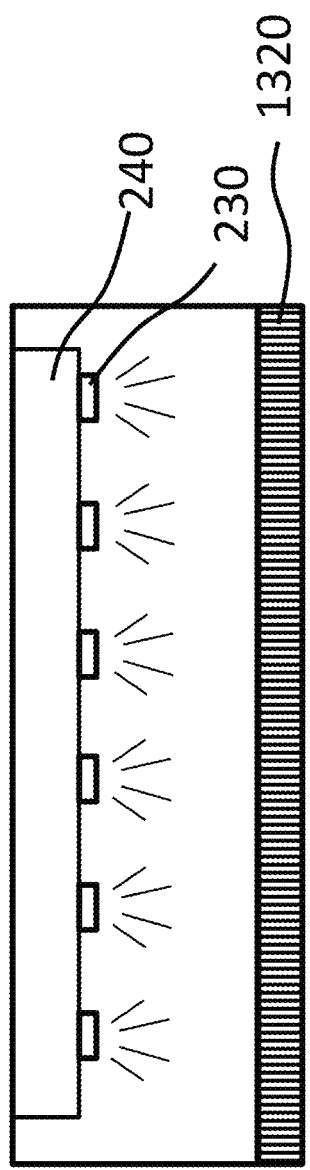
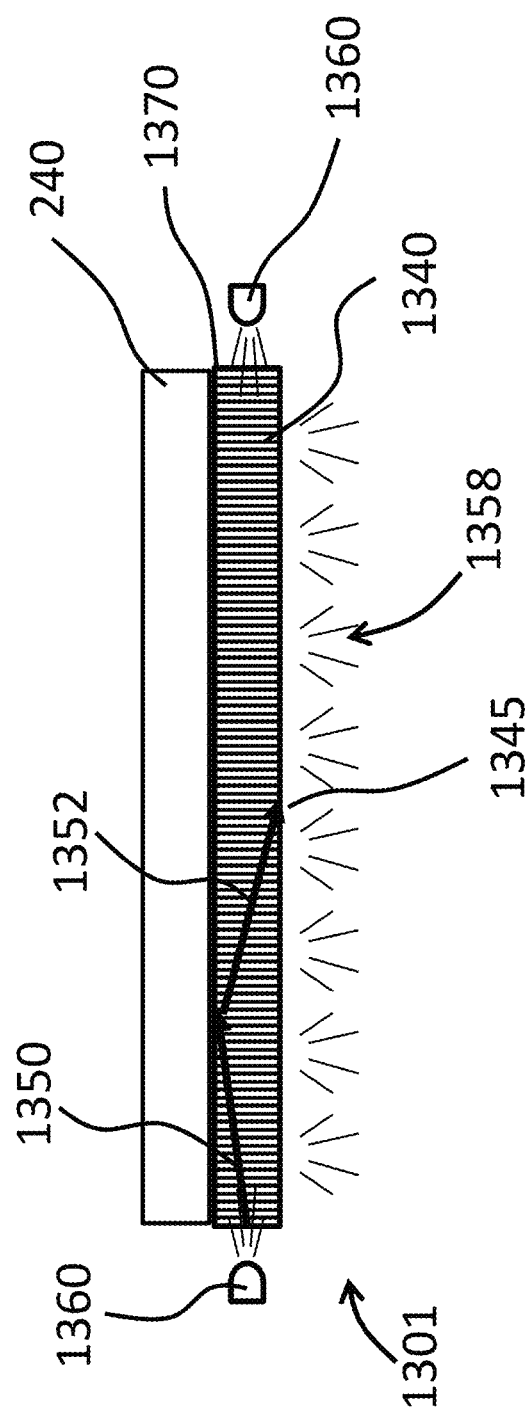

LIGHTING SYSTEMS INCORPORATING ACOUSTIC APERTURES

RELATED APPLICATIONS

This application claims the benefit of and priority to U.S. Provisional Patent Application No. 63/194,237, filed May 28, 2021, the entire disclosure of which is hereby incorporated herein by reference.

This application is also a continuation-in part of U.S. patent application Ser. No. 17/673,001, filed Feb. 16, 2022, which is a continuation of U.S. patent application Ser. No. 16/923,258, filed Jul. 8, 2020, which is a continuation-in-part of U.S. patent application Ser. No. 16/455,863, filed Jun. 28, 2019, which is a continuation-in-part of U.S. patent application Ser. No. 15/446,494, filed Mar. 1, 2017, which claims the benefit of and priority to U.S. Provisional Patent Application No. 62/302,434, filed Mar. 2, 2016, the entire disclosure of each of which is hereby incorporated herein by reference.

FIELD OF THE INVENTION

In various embodiments, the present invention generally relates improved acoustic performance for noise-reduction systems, specifically noise-reduction systems incorporating lighting.

BACKGROUND

Reduction of unwanted sound is a key issue in the design of new spaces and retrofitting of existing spaces. Unwanted sounds may arise from multiple sources, for example from outside the specific environment, e.g., road noise from outside a building, or from inside the specific environment, e.g., sounds from HVAC systems in an office or sound resulting from people speaking. Another example is sound privacy, where, for example, conversations need to be kept private. The inability to create appropriate sound environments, with the required control of sounds or noise, can lead to stress, frustration, and reduced productivity.

These issues are important in all environments, but are particularly important in offices, public spaces, and other open environments. Examples include open office concepts, where multiple people share a space with little to no physical and/or acoustic separation. Other examples of open spaces may include malls, lobbies, museums, restaurants, banks, retail shops, convention halls, etc.

Open spaces are often characterized by having a relatively large population of people. This contributes to noise generation from speech, where multiple people are speaking simultaneously with many separate conversations. This may make it difficult for the participants in each conversation to be easily understood.

Because open spaces typically need to support large numbers of people, it is desirable for those spaces to be constructed of hard durable materials, for example stone concrete, or tile on the surfaces. This is particularly true of the floor, but many buildings or environments use these materials on or for the walls and ceilings. Such hard materials typically are not good sound absorbers, thereby making the situation worse. For example, carpet will typically absorb more sound than stone, but is not as durable, nor is it as easy to clean.

Sound absorption in a material occurs by transfer of energy from the incident sound wave into the material, which is then often dissipated as heat. This energy transfer is more efficient for soft fibrous materials, whereas denser, harder materials are less absorptive and reflect more of the sound. In general, softer, more fibrous materials have relatively high sound absorption and hard rigid materials have relatively high sound reflectance. Sound absorption is also affected by the material thickness; the amount of sound absorbed typically increases with the material thickness.

Architects and acousticians look to incorporate materials with high sound absorption capability into environments to control the unwanted sound, but this becomes more challenging when multiple surfaces are made up of hard materials. One option is the use of acoustic baffles. These are typically constructed of highly sound-absorbing materials and may be mounted on walls or ceilings or hung from ceilings. While these can provide significant sound absorption, they are often not compatible with the design concept from an aesthetic perspective or there may not be enough space or area for them to achieve sufficient sound absorption. For example, open office concepts often have an open ceiling with clouds suspended from a hard ceiling (for example concrete). The clouds may incorporate some sound-absorption material, for example sound-absorbing ceiling tiles as well as lighting, but because they are limited in extent, they may not provide sufficient sound absorption.

Recently, sound-absorbing materials have been incorporated into lighting to introduce additional sound reduction without taking up additional space or area. In some instances, this is done by attaching sound-absorbing material, such as acoustic felt, fleece, acoustic PET or other materials with relatively high sound-absorbing properties to the outside of a luminaire. Because the amount of sound that is absorbed is a function of the sound-absorbing characteristics of the material and the area of the material, relatively small luminaires, such as pendants and linear fixtures may not be able to make an appreciable impact on sound reduction.

The sound-absorbing characteristics of a material may be quantified in several ways. One measure is the Noise Reduction Coefficient (NRC), which is a measure of the ratio of the level of sound that is absorbed by a material to the level of sound incident on the material. For example, a material having a NRC of 0.5 will absorb about half the sound incident on it and a material having a NRC of 0.8 will absorb about 80% of the sound incident on it. The NRC is a single number that represents the sound absorption over a range of frequencies. The absorption may also be quantified as a function of frequency, for example in a graph or table, showing the absorption per unit area as a function of frequency.

The actual amount of sound absorbed is measured in units of Sabin and is the product of the sound-absorbing characteristic of the material and the sound-absorbing area. For example, using NRC as a measure of the sound-absorbing characteristic of the material, the sound-absorption in metric Sabin is the product of the NRC and the sound-absorbing area in square meters. As the sound absorption is directly related to the sound-absorbing area, this explains why larger areas typically perform better and why small luminaires are typically not able to contribute significantly to overall sound absorption, even if the sound-absorbing material has a high NRC.

Luminaires may be made larger, for example to make large luminous surfaces, covering tens or hundreds or thousands of square feet on a ceiling and thus have the potential for high sound absorption because of their large area. These types of luminaires typically have an optical diffuser over the light source, which is most commonly light-emitting diode (LED) based, and this optical diffuser is typically optimized for high optical transmittance to achieve a high efficacy for the luminaire, often measured in lumens per watt. Materials having high optical transmittance often do not have either high acoustic absorption or high acoustic transmittance.

FIG. 1 shows a cross-sectional schematic of a luminaire 100 having a luminaire enclosure 110, an optical diffuser 120 and an illumination source 130. As discussed above, optical diffusers are typically chosen for high optical transmittance, and for large areas are typically made from a hard material, such as polymers like acrylic, polycarbonate or the like, or glass, or from a soft material like a fabric or polymer film, for example polyvinyl chloride (PVC). Hard optical diffusers like glass or polymer need to be relatively rigid to support themselves without significant sagging and thus typically have very low acoustic absorption characteristics (in fact these materials are typically used for blocking sound rather than absorbing sound). Fabrics are soft materials and can have high sound absorption, but for optical diffusers they need to be relatively thin, to have high optical transmittance, and thus tend to have relatively low sound absorption. While the sound absorption is relatively low, because the area is relatively large, the sound absorption can be relatively appreciable.

Fabric optical diffusers are often coated to enhance their properties, for example to permit printing by different printing technologies (for example UV printing, dye sublimation printing and the like) or to confer flame retardant properties on the fabric, or for other reasons. These coatings may cover the fibers in the fabric and/or fill up some or all of the space between fibers in the fabric, thus reducing the acoustic transmission as well as acoustic absorption.

Polymer films are not fibrous and thus typically have even lower sound absorption and sound transmission than fabrics. In some cases, polymer films have been perforated with small holes (on the order of about 1 mm diameter or less) that allow for some level of sound transmission and this has been combined with additional sound-absorbing material behind the polymer film. The perforated holes also allow light transmission, which permits undesirable visualization of the illumination source or sources. To eliminate this a second layer of optical diffuser is typically used, which further reduces the optical transmission and luminaire optical efficacy as well as the transmission of sound.

Accordingly, there is a need for solutions that provide lighting systems having a high optical efficacy as well as high sound absorption and low cost.

SUMMARY

Embodiments of the present invention relate to illumination systems that incorporate additional functionality that enables improved acoustic performance and specifically improved sound absorption.

Embodiments of the present invention also relate to illumination systems based on flexible light sheets and that incorporate additional functionality that enables various different mechanical mounting and electrical and/or mechanical joining techniques. For example, illumination systems in accordance with embodiments of the invention incorporate rigid or semi-rigid mounting frames that may also provide electrical connectivity. In various embodiments, the illumination systems are modular and feature connection mechanisms (e.g., snap connectors) that mechanically and electrically interconnect individual light panels or light sheets together and/or to power-distribution systems and/or to mounting rails.

Additional details of lighting systems in accordance with embodiments of the present invention appear within U.S. patent application Ser. No. 13/799,807, filed Mar. 13, 2013 (the '807 application), U.S. patent application Ser. No. 13/748,864, filed Jan. 24, 2013 (the '864 application), and U.S. patent application Ser. No. 14/699,149, filed Apr. 29, 2015 (the '149 application), the entire disclosure of each of which is incorporated by reference herein.

In an aspect, embodiments of the invention feature an acoustic lighting system that includes, consists essentially of, or consists of a luminaire enclosure, a first sound-absorbing material, a plurality of light-emitting elements, and at least one optical diffuser. The first sound-absorbing material is disposed within at least a portion of the luminaire enclosure, and has first and second opposing surfaces. The plurality of light-emitting elements are disposed over at least a portion of the first surface of the first sound-absorbing material within the lighting system enclosure and are spaced apart from each other such that the first sound-absorbing material is exposed through gaps between the light-emitting elements. The at least one optical diffuser is spaced apart from the light-emitting elements. The luminaire enclosure has (i) at least one opening over which the at least one optical diffuser is disposed and (ii) at least one acoustic aperture not occluded by the at least one optical diffuser.

Embodiments of the invention may include one or more of the following in any of a variety of combinations. The light-emitting elements may be disposed on a substrate. The substrate may define a plurality of openings between the light-emitting elements. The first sound-absorbing material may be exposed through the openings. The substrate may be flexible. At least one said acoustic aperture may have an acoustic transmission greater than 25%, or greater than 50%. The at least one optical diffuser may have an optical transmissivity greater than 25% for a wavelength of light emitted by at least one of the light-emitting elements. The first sound-absorbing material may include, consist essentially of, or consist of fiberglass, sound-absorbing foam, mineral wool, mineral fiber, acoustic fleece, polyester, polyester felt, polyethylene terephthalate, acoustic ceiling tile, and/or fiberglass foam. The at least one acoustic aperture may be configured to prevent passage of light from within the lighting enclosure.

The at least one acoustic aperture may include, consist essentially of, or consist of an array of through-holes. The at least one optical diffuser may have a first area, the at least one acoustic aperture may have a second area including a total area of all through-holes, and a percentage ratio of the second area to the first area may be at least 0.2%. The at least one optical diffuser may have a first area, the at least one acoustic aperture may have a second area including a total area of all through-holes, and a percentage ratio of the second area to the first area may be at least 1%. The at least one optical diffuser may have a first area, the at least one acoustic aperture may have a second area including a total area of all through-holes, and a percentage ratio of the second area to the first area may be within the range of about 0.1% to about 5%. The at least one optical diffuser may have a first area, the at least one acoustic aperture may have a second area including a total area of all through-holes, and a percentage ratio of the second area to the first area may be within the range of about 0.2% to about 2%.

The at least one acoustic aperture may have a total surface area including, consisting essentially of, or consisting of (a) a total area including a sum of areas of all of the through-holes and (b) a total area of the acoustic aperture less the sum of areas of all of the through-holes, and a percentage ratio of the sum of the areas of all of the through-holes to the total area of the acoustic aperture less the sum of areas of all of the through-holes may be at least 25%, or at least 50%.

At least one said acoustic aperture may be coplanar with the optical diffuser. The at least one acoustic aperture may be configured for mounting or attachment of at least a portion of the at least one optical diffuser (e.g., to the luminaire enclosure). The at least one acoustic aperture may have a first side and a second side opposite the first side. At least a portion of the first side may be configured for mounting or attachment of at least a portion of the at least one optical diffuser (e.g., to the luminaire enclosure). At least a portion of the second side may be configured for attachment or mounting to at least one of a wall or ceiling. The at least one optical diffuser may include, consist essentially of, or consist of at least a first portion and a second portion. The at least one acoustic aperture may have a first side and a second side opposite the first side. At least a portion of the first side may be configured for mounting or attachment of at least a portion of the first portion. At least a portion of the second side may be configured for mounting or attachment of at least a portion of the second portion.

At least a portion of the at least one acoustic aperture may be configured to be attached to a wall or another vertical surface. At least a portion of the at least one acoustic aperture may be configured to be attached to a ceiling or another horizontal surface. A second sound-absorbing material may be positioned behind the at least one acoustic aperture. The second sound-absorbing material may be positioned substantially perpendicular to the face of the at least one acoustic aperture. The at least one optical diffuser may include, consist essentially of, or consist of a fabric optical diffuser and/or a PVC optical diffuser. The at least one acoustic aperture may be configured for mounting of additional ceiling elements. Such additional ceiling elements may include, consist essentially of, or consist of track lights, spot lights, wall washer lights, linear lights, camera, fire sprinkler heads, heating and air conditioning ducts, microphones, and/or wireless radio access points. Means for suspending the lighting system from a wall or ceiling may extend from the luminaire enclosure and/or be disposed on the luminaire enclosure.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

Herein, two components such as light-emitting elements and/or optical elements being "aligned" or "associated" with each other may refer to such components being mechanically and/or optically aligned. By "mechanically aligned" is meant coaxial or situated along a parallel axis. By "optically aligned" is meant that at least some light (or other electromagnetic signal) emitted by or passing through one component passes through and/or is emitted by the other. As used herein, the terms "phosphor," "wavelength-conversion material," and "light-conversion material" refer to any material that shifts the wavelength of light striking it and/or that is luminescent, fluorescent, and/or phosphorescent.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1 is a schematic cross-section of a conventional luminaire;

FIG. 2A is a schematic cross-section of a luminaire in accordance with various embodiments of the invention;

FIGS. 2B-2E are schematics of portions of side views of a luminaire in accordance with various embodiments of the invention;

FIG. 3B is a schematic illustration of a lighting system in accordance with various embodiments of the invention;

FIG. 3C-3E are schematic cross-sections of a portion of a luminaire in accordance with various embodiments of the invention;

FIG. 4 is a schematic cross-section of a luminaire in accordance with various embodiments of the invention;

FIG. 5A is a schematic cross-section of a luminaire in accordance with various embodiments of the invention;

FIG. 5B is a schematic cross-section of a portion of a luminaire in accordance with various embodiments of the invention;

FIG. 6A is a schematic cross-section of a portion of a luminaire in accordance with various embodiments of the invention;

FIGS. 6B-6C are schematic view of an element of a luminaire in accordance with various embodiments of the invention;

FIGS. 7A-7E are schematic cross-sections of a luminaire in accordance with various embodiments of the invention;

FIGS. 8A-8D are schematic cross-sections of a luminaire in accordance with various embodiments of the invention;

FIGS. 9A and 9B are schematic illustrations of portions of a luminaire in accordance with various embodiments of the present invention;

FIGS. 10A-10E are schematic illustrations of portions of an acoustic lighting systems in accordance with various embodiments of the present invention;

FIGS. 12A-12D are schematic illustrations of portions of acoustic lighting systems in accordance with various embodiments of the present invention;

FIGS. 13A and 13B are schematic illustrations of acoustic lighting systems in accordance with various embodiments of the present invention;

DETAILED DESCRIPTION

Figure 2D:
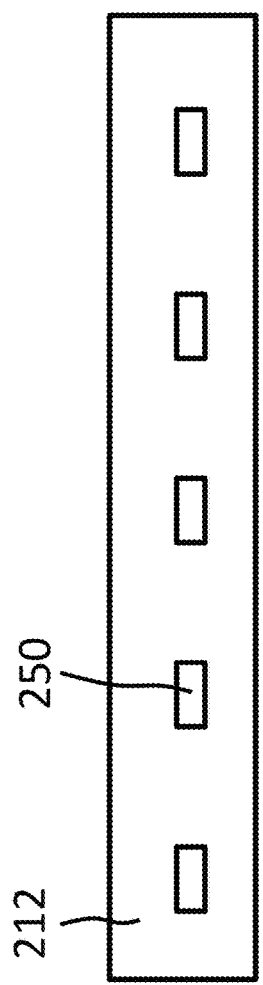

FIG. 2A depicts a cross-sectional view of an exemplary acoustic lighting system 200 in accordance with embodiments of the present invention, although alternative systems with similar functionality are also within the scope of the invention. In various embodiments, acoustic luminaire 200 includes, consists essentially of, or consists of one or more light-emitting elements or illumination elements 230 mounted on or in front of a sound-absorbing material 240, which is mounted in a luminaire frame 210, the luminaire frame incorporating one or more acoustic apertures 250, and an optical diffuser 220.

Acoustic luminaire 200 may also incorporate one or more features of luminaires described in U.S. patent application Ser. No. 16/923,258, filed Jul. 8, 2020 (the '258 application), the entire disclosure of which is herein hereby incorporated by reference.

Referring to FIG. 2A, sound waves 270, from within the environment into which acoustic luminaire 200 is placed and incident on luminaire 200, may be transmitted into the interior of luminaire 200, identified in FIG. 2A as cavity 215, through at least two pathways. A first pathway is through optical diffuser 220 and a second pathway is through acoustic apertures 250. Once the sound waves are inside cavity 215, they may be incident upon the interior surfaces of cavity 215, for example exposed portions 242 of sound-absorbing material 240, illumination elements 230, and the interior walls 280 of luminaire enclosure 210.

In various embodiments of the present invention, acoustic apertures 250 are configured to provide a relatively high acoustic transmittance pathway for incident sound waves to enter into luminaire cavity 215 where they may be incident upon and absorbed or partially absorbed by sound-absorbing material 240 or by exposed regions 242 of sound-absorbing material 240 or by other materials within cavity 215. In various embodiments of the present invention, acoustic apertures 250 may be configured to provide significantly higher acoustic transmission than diffuser 220. For example, while the total area of acoustic apertures 250 may be less than the area of the diffuser 220, the total acoustic transmission through the acoustic apertures 250 may be greater than through the diffuser 220.

In various embodiments of the present invention, unlike the materials of construction for luminaire enclosure 210 or optical diffuser 220, sound-absorbing material 240 may be chosen specifically for its high sound-absorbing properties, for example a high NRC, with less regard for other properties, for example optical transmittance, structural properties or the like. In various embodiments of the present invention, sound-absorbing material 240 may have an NRC of at least about 0.6, or at least about 0.75, or at least about 0.8 or at least about 0.9. As is known to those skilled in the art, the NRC theoretically is in the range of 0 to 1.0, but because NRC values are calculated from measurements and are not reported as a percentage, it is possible to have measured values greater than 1.0, for example in the range 1.0 to about 1.2 or even higher. Thus, in accordance with various embodiments of the present invention, sound-absorbing material 240 may have an NRC of about 1.4 or less, about 1.2 or less, or about 1.0 or less.

In various embodiments of the present invention, sound-absorbing material 240 may have a thickness of at least about 3 mm, or at least about 5 mm, or at least about 10 mm, or at least about 25 mm, or at least about 50 mm. In various embodiments of the present invention, larger thicknesses of sound-absorbing material 240 may be utilized to increase the sound-absorption capability of sound-absorbing material 240. In various embodiments of the present invention, sound-absorbing material 240 includes, consists essentially of, or consists of one or more of PET, rockwool, mineral wool, fiberglass, fabric, foam, open cell foam, cotton, aerogel, aerogel mat, or the like.

In general, increasing the thickness of the sound absorbing material results in an increased level of sound absorption and an increase in the level of sound absorption at the lower frequency range. Typically, sound absorption materials have thicknesses in the range of about 9 mm to about 100 mm, but smaller and larger thicknesses may be employed in various embodiments of the present invention. In addition to the amount of sound absorption desired, the thickness of sound absorption material may also be limited by available space and/or expense limits.

Unlike conventional acoustic lighting systems, acoustic lighting systems in accordance with embodiments of the present invention provide a relatively high acoustic transmittance pathway, through acoustic apertures 250, for sound waves incident on the acoustic lighting system to be absorbed by sound-absorbing material 240. This is in addition to the relatively lower acoustic transmittance pathway through optical diffuser 220 of conventional luminaires. As discussed herein, optical diffuser materials typically have relatively low acoustic transmittance because of their materials of construction. This is particularly true for solid or rigid, non-perforated optical diffusers.

This second relatively high acoustic transmittance pathway, combined with the ability to tailor the thickness and characteristics of sound-absorbing material independent of structural or optical requirements, provide for improved sound absorption and the ability to better control undesired sounds or noise.

FIG. 2B shows a side view of acoustic luminaire 200 showing a schematic view of a portion of side wall 212 and acoustic apertures 250. While FIG. 2B shows acoustic apertures 250 as having a circular shape, this is not a limitation of the present invention and in other embodiments acoustic apertures may have different shapes, for example square, rectangle, slot, oval, polygon, triangle or any arbitrary shape. While FIG. 2B shows acoustic apertures 250 positioned to have a relatively constant spacing between each acoustic aperture, this is not a limitation of the present invention and in other embodiments acoustic apertures 250 may be spaced or positioned with varying and/or arbitrary distances between each aperture.

FIG. 2B shows a luminaire side wall 212 as having a single row of acoustic apertures 250; however, this is not a limitation of the present invention and in other embodiments luminaire sidewall 212 may have more than one row of acoustic apertures 250, or acoustic apertures 250 may be positioned in arrangements other than rows. For example, FIG. 2C shows acoustic apertures 250 having an oval shape and being positioned in two rows with each acoustic aperture 250 with offset positions in each row, while FIG. 2D shows acoustic apertures 250 having a rectangular shape.

Figure 2E:
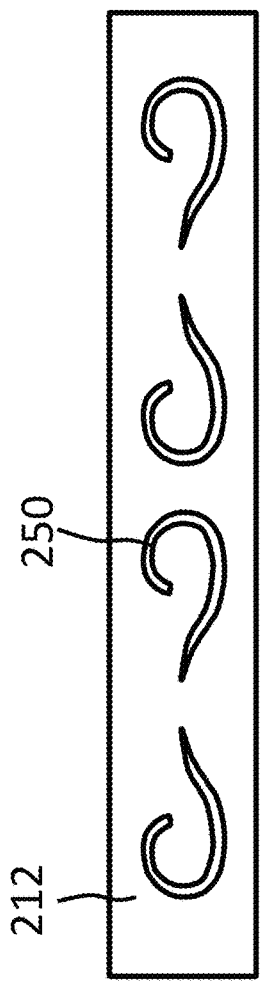

In various embodiments of the present invention acoustic apertures 250 may form a decorative design, for example a scroll shape, as shown in FIG. 2E or any other decorative shapes. The shape or position of acoustic apertures 250 is not a limitation of embodiments of the present invention.

In various embodiments of the present invention, acoustic apertures 250 may also be optically transparent or translucent, that is have an optical transmission greater than about zero. In various embodiments of the present invention light emitted by illumination elements 230 may reflect from the interior face of optical diffuser 220 (the face inside cavity 215) and/or the interior walls or other elements within luminaire enclosure 210 and subsequently be emitted through acoustic apertures 250 even if acoustic apertures 250 are not aligned in a line-of-sight direction to illumination elements 230.

In various embodiments of the present invention, the shape of acoustic apertures 250 may be configured or designed to provide an aesthetically desirable light pattern on sidewall 212, where illumination source or sources 230 provide light that is transmitted not only through optical diffuser 220 but through acoustic apertures 250.

Figure 2F:
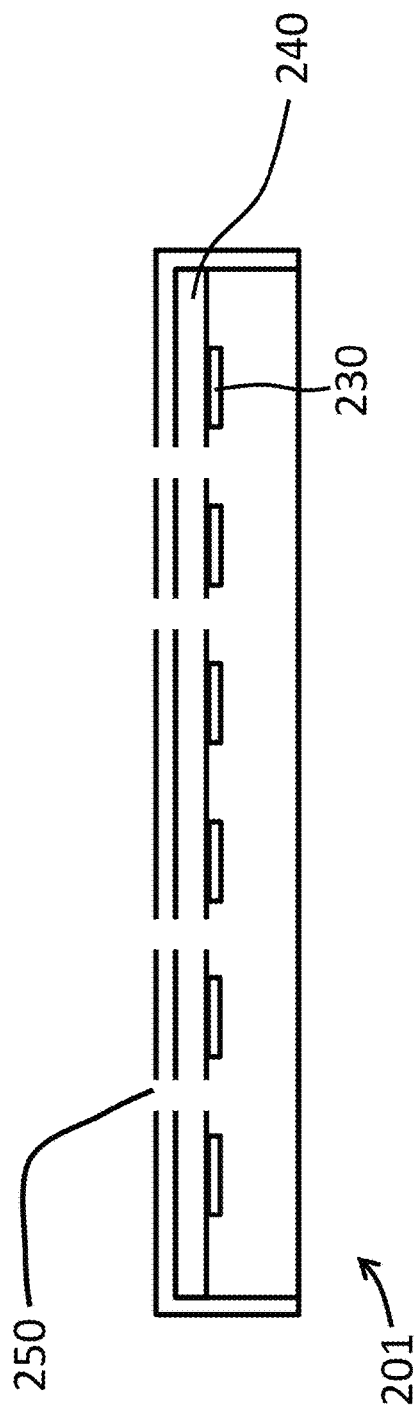
FIG. 2F is a schematic cross-section of a luminaire in accordance with various embodiments of the invention.

While FIG. 2A shows acoustic apertures 250 located in the sidewalls of the lighting system, this is not a limitation of the present invention and in other embodiments acoustic apertures may be located in other regions or portions of the lighting system. FIG. 2F shows a cross-sectional view of an acoustic luminaire 201 that is similar to luminaire 200, except that luminaire 201 includes acoustic apertures 250 located on the back of lighting system 201. While FIG. 2F shows acoustic apertures 250 located only in the back of lighting system 201, this is not a limitation of the present invention, and in other embodiments acoustic apertures 250 may be located in both the back and one or more sides of the lighting system and/or in the optical diffuser of the lighting system or may be located in other areas or regions of the lighting system.

Figure 3A:
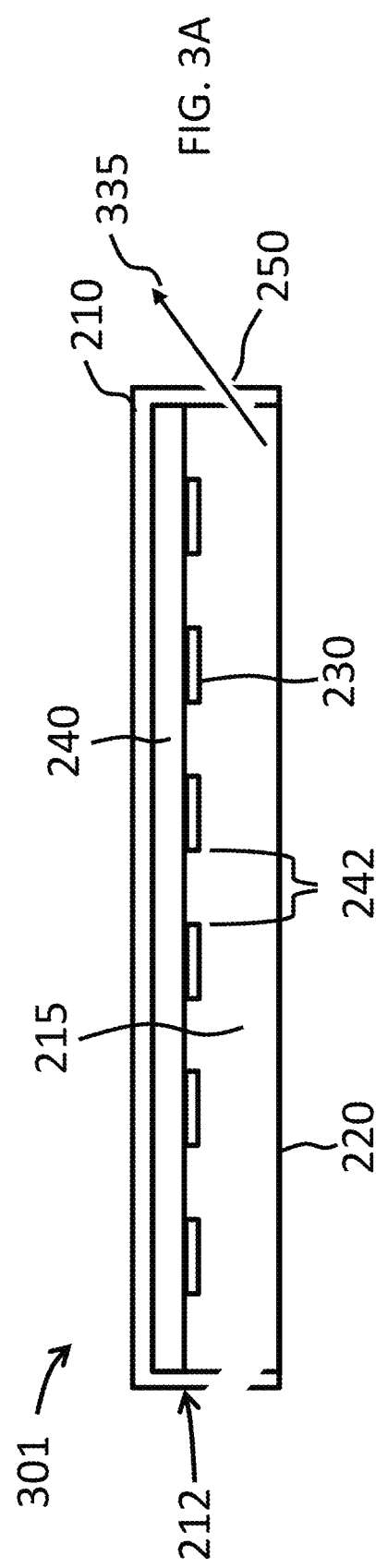
FIG. 3A is a schematic cross-section of a luminaire in accordance with various embodiments of the invention.

In various embodiments of the present invention, the acoustic apertures may be aligned or oriented to direct the light emitted from the acoustic aperture in one or more specific directions. For example, acoustic apertures 250 in lighting system 301 shown in FIG. 3A are oriented so that the light, identified in FIG. 3A as light 335, is emitted from acoustic apertures 250 in an upwards direction. In various embodiments of the present invention light emitted from acoustic apertures 250 may provide indirect lighting to complement the direct lighting emitted through or from the optical diffuser. In various embodiments of the present invention, the indirect light may be oriented to be incident on the ceiling. In various embodiments of the present invention, acoustic apertures may be designed or configured to provide decorative or functional illumination.

In various embodiments of the present invention, acoustic apertures 250 may be aligned so that there is no line-of-sight, identified as 330 in FIG. 3B, directly from an observer in the environment of the luminaire to illumination elements 230. FIG. 3C shows an enlarged portion of FIG. 3B, indicating that there is no line-of-sight 330 between the observer and illumination element 230. FIG. 3C also depicts an embodiment of the present invention in which light 335 emitted from aperture 250 is incident upon ceiling 310.

In various embodiments of the present invention, optical elements, for example including lenses, optical diffusers, reflectors, filters, baffles, light-blocking baffles, total internal reflection optics, or the like may be incorporated in portions of acoustic apertures 250 and/or in portions of cavity 215 to control and direct the light emitted from acoustic apertures 250. In various embodiments of the present invention, the optical elements may also be acoustically transparent or substantially optically transparent. In various embodiments of the present invention, the optical elements may be positioned such that sound or acoustic energy may pass around them but all or substantially all the light passes through them. In various embodiments of the present invention, the light emitted from acoustic apertures 250 may have one or more different characteristics than light emitted from optical diffuser 220, for example having a different color, correlated color temperature (CCT), color point, intensity, color rendering index (CRI) or the like. In various embodiments of the present invention, a filter may be placed within cavity 215 in front of acoustic aperture 250 to modify one or more characteristics of the light emitted from illumination elements 230. For example, FIG. 3D shows a filter 340 over acoustic aperture 250. In various embodiments of the present invention, filter 340 may include, consist essentially of, or consist of a low-pass filter, a high-pass filter, a bandpass filter, a filter with multiple pass bands or any other arbitrary filter. In various embodiments, filter 340 may include, consist essentially of, or consist of glass, a polymer such as acrylic, polycarbonate or the like, a diffraction filter or the like. The type or composition of filter 340 is not a limitation of the present invention. While FIG. 3D shows filter 340 positioned within cavity 215, this is not a limitation of the present invention and in other embodiments filter 340 may be positioned on the outside of luminaire.

In various embodiments of the present invention, an acoustically transparent material means a material that allows the transmission of sound or acoustic energy. In various embodiments of the present invention sound or acoustic energy may be defined as a vibration that propagates as an acoustic or sound wave that is oscillating at a frequency in the range of about 20 Hz to about 20 kHz. In various embodiments of the present invention an acoustically transparent material may have a transmittance of sound or acoustic energy that is greater than about 25% or greater than about 40% or greater than about 60% or greater than about 75% or greater than about 90%. In various embodiments of the present invention an acoustically transparent material may have a transmittance of sound or acoustic energy that is greater than about 25% or greater than about 40% or greater than about 60% or greater than about 75% or greater than about 90% for one or more frequencies within the frequency range of about 20 Hz to about 20 kHz. In various embodiments of the present invention an acoustically transparent material may have a transmittance of sound or acoustic energy that is greater than about 25% or greater than about 40% or greater than about 60% or greater than about 75% or greater than about 90% in the frequency range of about 100 Hz to about 10,000 kHz.

In various embodiments of the present invention the transmittance of sound or acoustic energy may not be the same across all frequencies. In various embodiments of the present invention an acoustically transparent material may have a minimum transmittance of sound or acoustic energy that is greater than about 25% or greater than about 40% or greater than about 60% or greater than about 75% or greater than about 90% in the frequency range of about 100 Hz to about 10,000 kHz.

In various embodiments of the present invention acoustically transparent materials, or non-acoustically opaque materials, may be characterized in general by having a low resistance to air flow. In various embodiments of the present invention acoustically transparent materials, or non-acoustically opaque materials, may be characterized in general by having an open or porous structure. In various embodiments of the present invention acoustically transparent materials, or non-acoustically opaque materials, may be characterized by having a high optical transmittance, for example greater than about 25% or greater than about 40% or greater than about 60% or greater than about 75% or greater than about 90%. In various embodiments of the present invention acoustically transparent materials, or non-acoustically opaque materials, may be characterized by having a high optical transmittance within the range of 400 nm to about 600 nm, for example greater than about 25% or greater than about 40% or greater than about 60% or greater than about 75% or greater than about 90%.

In various embodiments of the present invention a material may be considered acoustically transparent if it results in no or substantially no reduction in the Noise Reduction Coefficient (NRC) when it is mounted over an acoustically absorbing material. In various embodiments of the present invention a material may be considered acoustically transparent if, when mounted over a fiberglass acoustic board about 2" thick having a density of about 6 pounds per cubic foot (for example Owens Corning 705, manufactured by Owens Corning Insulating Systems, Toledo, Ohio, USA), if it results in a reduction of about 0.15 or less, or of about 0.1 or less, or of about 0.05 or less in the NRC of the acoustic board, as measured per ASTM C423, the entire disclosure of which is incorporated by reference herein.

In various embodiments of the present invention an acoustically transparent fabric may be characterized by a relatively low thickness and/or a relatively low thread count and/or a relatively low resistance to air flow. In various embodiments of the present invention an acoustically transparent fabric may have a thickness less than about 1 mm, or less than about 500 µm, or less than about 300 µm or less than about 200 µm or less than about 100 µm. In various embodiments of the present invention an acoustically transparent fabric may be characterized by a thread count of less than about 400 threads per inch or less than about 300 threads per inch or less than about 250 threads per inch. In various embodiments of the present invention an acoustically transparent fabric may have a density of less than about 300 gm/m$^2$ or less than about 200 gm/m$^2$ or less than about 150 gm/m$^2$.

In various embodiments an acoustically transparent material may be relatively porous. In various embodiments of the present invention an acoustically transparent material may have a pore count greater than about 10, or greater than about 20, or greater than about 30, or greater than about 40, as determined in accordance with ASTM D3574-91, the entire disclosure of which is incorporated by reference herein. In various embodiments an acoustically transparent material may be relatively porous. In various embodiments of the present invention an acoustically transparent material may have an air flow greater than about 5 cubic feet per minute, or greater than about 10 cubic feet per minute, or greater than about 15 cubic feet per minute, as determined in accordance with ASTM D3574-91.

In various embodiments of the present invention an acoustically transparent material may include fabric, open cell foam, polymeric screen, metal screen and the like. In various embodiments an acoustically transparent material may include Speaker/Filter Foam (30PPI) sold by the Foam Factory in Macomb, Michigan, USA. In various embodiments an acoustically transparent material may include Flag Supreme fabric sold by Pongs in Pausa-Muhltroff, Germany. In various embodiments an acoustically transparent material may include fabrics such as Intermix, Jane, Marin, Studio 54, FR701 and other acoustic fabrics sold by the Gillford of Maine, Guilford, Maine, USA.

In various embodiments of the present invention, filter 340 may be configured and positioned to provide a pathway for acoustic energy to enter cavity 215 while ensuring all or substantially all light emitted through acoustic aperture 250 has passed through filter 340. In various embodiments of the present invention filter 340 may be configured such that all or substantially all the light that exits through acoustic aperture 250 passes through filter 340 while allowing all or substantially all sound energy coming into the luminaire through acoustic aperture 250 to pass around filter 340. FIG. 3D shows filter 340 spaced apart from acoustic aperture 250, such that sound energy may pass around filter 340 while all or substantially all of the light passes through filter 340. FIG. 3D shows filter 340 having a size substantially larger than the size of acoustic aperture 250, such that sound energy may pass around filter 340 while all or substantially all the light passes through filter 340. In various embodiments of the present invention, the area of filter 340 or an optical element may be at least about 10 times as large as the area of acoustic aperture 250, or at least about 50 times as large as the area of acoustic aperture 250, at least about 100 times as large as the area of acoustic aperture 250. In various embodiments of the present invention, the spacing between filter 340 or an optical element may be at least about 0.1 cm, or at least about 0.5 cm, or at least about 1 cm, or at least about 2 cm.

FIG. 3E shows a baffle 350 positioned in front of acoustic aperture 250. In various embodiments of the present invention, baffle 350 may be configured to allow all or substantially all acoustic energy from acoustic aperture 250 to pass around it into the interior of the luminaire while also reducing or eliminating or substantially eliminating the amount of light exiting through acoustic apertures 250; however, this is not a limitation of the present invention, and in other embodiments baffle 350 may be configured to enhance the amount of light exiting through acoustic apertures 250. In various embodiments of the present invention, baffle 350 may include, consist essentially of, or consist of metal, for example aluminum or steel, a polymer such as acrylic or polycarbonate, fabric, glass or the like. In various embodiments of the present invention, the surface of baffle 350 may be configured to have a reflectance to light emitted by illumination elements 230 of at least about 50% or at least about 75% or at least about 85% or at least about 90%. In various embodiments of the present invention, the surface of baffle 350 may be configured to have a reflectance to light emitted by illumination elements 230 below about 40%, or below about 25%, or below about 10%.

In various embodiments of the present invention, acoustic apertures 250 may be partially or completely covered by a material that is acoustically transparent but that has other desirable characteristics, for example it may be optically opaque or have a low optical transmittance, or it may be opaque to foreign objects that may be incident on sidewall 212 in the region of acoustic apertures 250, for example bugs, dust, moisture, water vapor or the like.

In various embodiments of the present invention, acoustic apertures 250 may be partially or completely covered by a material that is acoustically transparent but that is opaque to foreign objects. FIG. 4 shows lighting system 400 incorporating screen material 410 covering acoustic apertures 250. In FIG. 4 screen material 410 is positioned on the inside of cavity 215; however, this is not a limitation of the present invention, and in other embodiments screen material 410 may be positioned on the outside of luminaire enclosure 210 covering acoustic apertures 250 or may be positioned on both the inside and outside of acoustic apertures 250 and/or may be positioned within the walls of luminaire enclosure 210. In various embodiments of the present invention, both outside and inside portions of acoustic apertures 250 may be covered or partially covered by screen material 410 and screen material 410 on the inside may be the same or different than screen material 410 on the outside.

In various embodiments of the present invention, screen material 410 may be acoustically transparent. In various embodiments of the present invention, screen material 410 may have a sound transmittance of at least about 25% or at least about 50% or at least about 75% or at least about 85%. In various embodiments of the present invention, screen material 410 may include or consist of an acoustically transparent fabric, a polymeric screen, a metal screen, a perforated polymeric sheet or film, a porous foam, or the like. As understood by those of skill in the art, a screen material 410 having a desired transmittance may be selected without undue experimentation based on, e.g., sizes and/or shapes of apertures formed by and within the screen material 410, which may be woven, meshed, or otherwise formed of fibrous materials or netting, and/or the composition of the screen material 410. In various embodiments of the present invention, screen material 410 may be attached to sidewall 212 by welding, adhesive, glue, tape, mechanical fasteners or the like.

In various embodiments of the present invention, luminaire frame 210 may include a side wall 212 constructed of a single layer of material; however, this is not a limitation of the present invention, and in other embodiments of the present invention sidewall 212 may include, consist essentially of, or consist of two or more layers.

FIG. 5A depicts a cross-sectional view of an exemplary lighting system 500 in accordance with embodiments of the present invention, although alternative systems with similar functionality are also within the scope of the invention. Lighting system 500 includes a luminaire enclosure having a sidewall 212 made up on one layer of material, for example metal such as steel or aluminum, a polymer such as acrylic, polycarbonate, ABS or the like or other materials.

Referring back to FIG. 4, FIG. 4 depicts a cross-sectional view of an exemplary lighting system 400 including a luminaire enclosure having a sidewall 212 composed of two layers of material, for example metal such as steel or aluminum, a polymer such as acrylic, polycarbonate, ABS or the like or other materials.

In various embodiments of the present invention, all or portions of sidewall 212 may be composed of one, two, or more layers. FIG. 5B shows a magnified portion of sidewall 212 of lighting system 400 depicted in FIG. 4. The magnified view shown in FIG. 5B does not show optical diffuser 220 for clarity and also includes a separate back panel 521 to support sound-absorbing material 240. In various embodiments of the present invention, back panel 521 may include, consist essentially of, or consist of a metal sheet, for example aluminum or steel, an acrylic panel, a composite panel such as an aluminum composite panel such as KapaTech, manufactured by 3A Composites. In various embodiments of the present invention, back panel 521 may not be utilized, for example in embodiments in which sound-absorbing material 240 may provide sufficient support and rigidity without the use of back panel 521.

In various embodiments of the present invention, acoustic apertures 250 may include, consist essentially of, or consist of one or more apertures 520 through the inside wall 530 and one or more apertures 521 through outside wall 531. In various embodiments of the present invention, no portion of any aperture 520 overlaps with any portion of apertures 521 such that there is no line-of-sight visibility into the luminaire sidewall through apertures 520 and 521; however, this is not a limitation of the present invention and in other embodiments apertures 520 and 521 may be positioned such that one may, when viewing perpendicularly to sidewall 212, see the inside of cavity 215 by looking through apertures 520 and 521.

In various embodiments of the present invention, the number of apertures 520 may be equal to the number of apertures 521; however, this is not a limitation of the present invention, and in other embodiments the number of apertures 520 may be different from the number of apertures 521. In various embodiments of the present invention, the number of apertures 520 on one side of a lighting system may be equal to the number of apertures 521 on the same side of a lighting system; however, this is not a limitation of the present invention, and in other embodiments the number of apertures 520 on one side of a lighting system may be different from the number of apertures 521 on the same side of a lighting system.

In various embodiments of the present invention, apertures 520, 521 and/or 250 may be covered or filled or partially filled with n acoustically transparent material. In various embodiments of the present invention, the acoustically transparent material may include, consist essentially of, or consist of fabric, cloth, sponge, cotton wool, metal screen, polymer screen, or the like. In various embodiments of the present invention, the non-acoustically opaque material may have a relatively high reflectance for light emitted by illumination sources 230, for example a reflectance of at least about 30% or at least about 50% or at least about 75% or at least about 85%.

In various embodiments of the present invention, apertures 520, 521 and/or 250 may be partially filled, substantially filled or completely filled with an acoustically transparent plug or cap. FIG. 6A depicts a cross-sectional view of a portion of an exemplary lighting system in accordance with embodiments of the present invention, although alternative systems with similar functionality are also within the scope of the invention. Referring to FIG. 6A, aperture 520 is filled with acoustically transparent plug 610. While FIG. 6A shows acoustically transparent plug 610 in aperture 520, this is not a limitation of the present invention, and in other embodiments acoustically transparent plugs may also be installed in apertures 521 and/or apertures 250.

In various embodiments of the present invention, plug 610 may include a narrow or recessed portion identified as seating region 620 in FIG. 6B, which may seat on the frame wall, to form a partial or substantially complete or complete seal between acoustic plug 610 and the frame and/or to hold plug 610 into the frame, as shown in FIGS. 6B and 6C. In various embodiments of the present invention, plug 610 may protrude into lighting cavity 215 by a relatively small amount, for example to prevent shadowing or blocking of light from illumination sources 230. In various embodiments of the present invention, plug 610 may protrude into lighting cavity 215 by less than about 2 mm, or less than about 5 mm or less than about 10 mm or less than about 25 mm. In various embodiments of the present invention, plug 610 may have a relatively high reflectance for light emitted by illumination sources 230, for example a reflectance of at least about 30% or at least about 50% or at least about 75% or at least 85%. For example, plug 610 may include, consist essentially of, or consist of a metallic material, and/or may be coated with a metallic material or a white or colored pigment.

In various embodiments of the present invention, acoustically transparent material or plugs may be the same, that is be made of the same material, or have the same size and/or shape or other features on the inside and outside of the luminaire frame; however, this is not a limitation of the present invention, and in other embodiments acoustically transparent material or plugs on the inside and outside of the luminaire frame may be different, that is be made of the different materials, and/or have different sizes and/or different shapes or other different features.

In various embodiments of the present invention, the acoustically transparent material may have an acoustic transmittance of at least about 20%, or at least about 40%, or at least about 50%, or at least about 75%, or at least about 85%. In various embodiments of the present invention, the acoustically transparent material may have an acoustic transmittance over the frequency range from about 125 Hz to about 4000 Hz of at least about 20%, or at least about 40%, or at least about 50%, or at least about 75%, or at least about 85%. In various embodiments of the present invention, the acoustically transparent material may have an acoustic transmittance over the frequency range from about 250 Hz to about 2000 Hz of at least about 20%, or at least about 40%, or at least about 50%, or at least about 75%, or at least about 85%. In various embodiments of the present invention the acoustically transparent material may have an acoustic transmittance over the frequency range from about 500 Hz to about 2000 Hz of at least about 20%, or at least about 40%, or at least about 50%, or at least about 75%, or at least about 85%.

In various embodiments of the present invention, the area of the acoustic apertures may be in the range of about 0.0001 $m^2$ to about 0.4 $m^2$ per square meter of lighting system area or in the range of about 0.001 $m^2$ to about 0.2 $m^2$ per square meter of lighting system area, or in the range of about 0.005 $m^2$ to about 0.1 $m^2$ per square meter of lighting system area. In various embodiments of the present invention, the area of the acoustic apertures may be in the range of about 0.25% to about 50% of the sidewall area of the lighting system, or in the range of about 1% to about 25% of the sidewall area of the lighting system, or in the range of about 5% to about 15% of the sidewall area of the lighting system.

While FIG. 3B shows lighting system 301 attached directly to ceiling 310, also known as a surface mount configuration, this is not a limitation of the present invention and in other embodiments lighting system 301 may be mounted in different configurations. In various embodiments of the present invention, the lighting system may be spaced apart from the ceiling, for example a relatively short distance or a relatively longer distance, also called a suspended or pendant mount and supported from a surface or may be recessed into a surface.

Figure 7A:
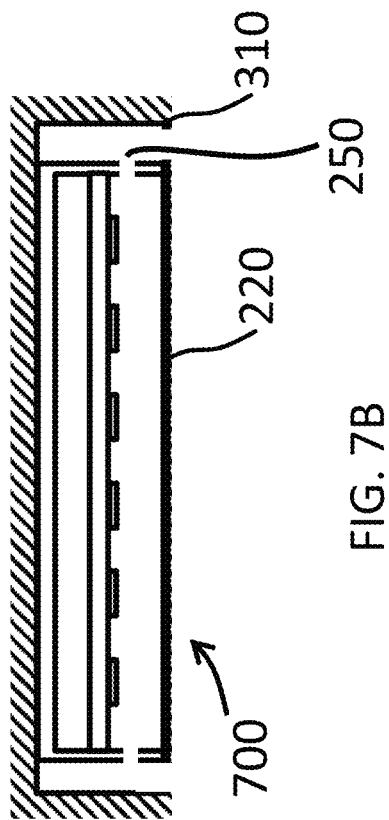

Referring to FIG. 7A, FIG. 7A depicts a cross-sectional view of an exemplary lighting system 700 suspended or hanging from surface or ceiling 310 by supports 715.

Figure 7B:
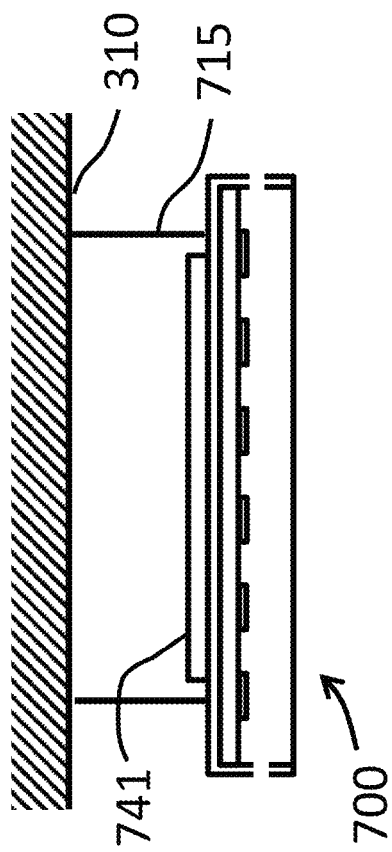
Figure 7C:
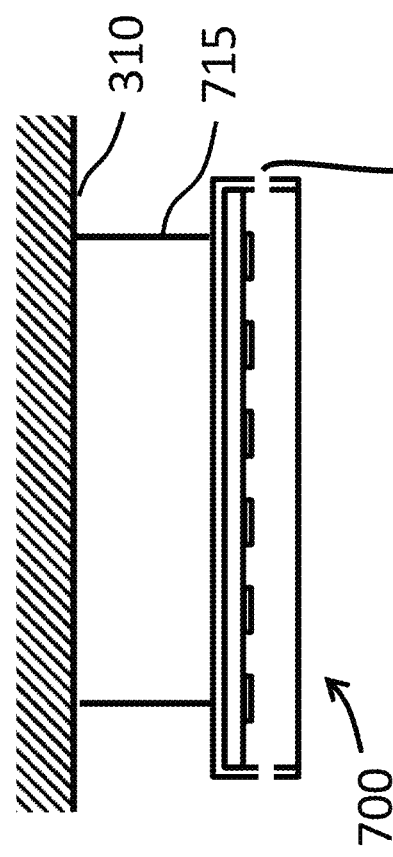

In various embodiments of the present invention, supports 715 may include, consist essentially of, or consist of one or more cables (e.g., aircraft cables), rods (e.g., threaded rods), or the like. In various embodiments of the present invention, lighting system 301 may be recessed into ceiling 310, with optical diffuser 220 flush or substantially flush with the surface of ceiling 310, as shown in FIG. 7B. While FIG. 7B shows acoustic luminaire 700 completely recessed into ceiling or mounting surface 310, such that optical diffuser 220 is flush or substantially flush with ceiling or mounting surface 310, this is not a limitation of the present invention and in other embodiments acoustic luminaire 700 may be positioned such that optical diffuser 220 may protrude beyond ceiling or mounting surface 310 or may be recessed into ceiling or mounting surface 310. FIG. 7C shows lighting system 700 incorporating acoustic apertures 250 located in the top/back of the lighting system.

Figure 7D:
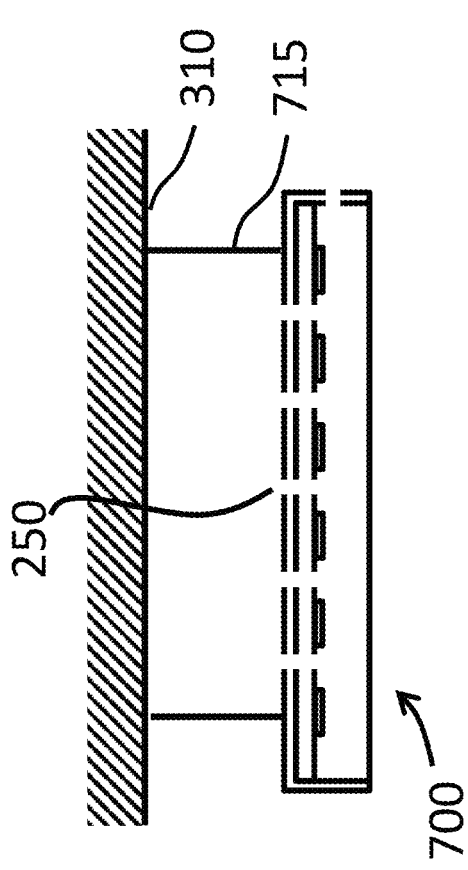

In various embodiments of the present invention, additional acoustic material may be positioned on the top of the acoustic luminaire when using the suspended mounting configuration. FIG. 7D shows acoustic luminaire 700 suspended from ceiling or mounting surface 310 incorporating additional acoustic material 741 on top of luminaire enclosure 210. Because additional acoustic material 741 is directly accessible to incident sound waves, additional acoustic material 741 may be utilized to further improve sound absorption of acoustic luminaire 700. In various embodiments of the present invention, additional acoustic material 741 may not be visible or may not be substantially visible to occupants of the space in which acoustic luminaire 700 is installed. This permits additional sound absorption capability without affecting or substantially affecting the visual appearance of the luminaire. FIG. 7E shows an exemplary luminaire 701 incorporating acoustic apertures 250 in the back of lighting system 701 as well as additional acoustic material 741, in which apertures 250 are formed in additional acoustic material 741 as we as acoustic material 240 and luminaire frame 210.

In various embodiments of the present invention, luminaire enclosure 210 is typically made of a hard rigid material, for example aluminum, steel or a polymer and typically has a relatively low ability to absorb sound waves. In various embodiments of the present invention, optical diffuser 220 may be typically constructed of a material with a high optical transmittance, to achieve a high optical efficacy of luminaire 200. Typical diffuser materials may include hard or rigid polymeric materials such as acrylic or polycarbonate or the like, or flexible materials such as fabric or films, for example PVC films. In various embodiments of the present invention optical diffuser 220 may incorporate any materials.

FIG. 8A depicts a cross-sectional view of an exemplary acoustic lighting system 800 in accordance with embodiments of the present invention, although alternative systems with similar functionality are also within the scope of the invention. In various embodiments, acoustic luminaire 800 includes, consists essentially of, or consists of one or more light-emitting elements or illumination elements 230 mounted on or in front of a sound-absorbing material 240, which is mounted in a luminaire frame or enclosure 810, the luminaire frame incorporating an optical diffuser 820 and front-facing acoustic aperture 850. In contrast to acoustic apertures 250 shown in FIG. 2A, front-facing acoustic apertures are formed in a plane that is parallel to or substantially parallel to diffuser 220. In various embodiments of the present invention front-facing acoustic apertures 850 may be formed in the same material as diffuser 220 or may be formed in a separate material. In accordance with various embodiments of the invention, the acoustic apertures and/or front-facing apertures provide sufficient transmission of acoustic energy, and the optical diffuser 820 itself does not define any apertures (e.g., is not perforated). Such embodiments may advantageously help provide illumination while blocking an observer's direct line of sight to the illumination elements themselves.

A key aspect of this embodiment of the present invention is the separation of the components configured for transmission of light out of the luminaire and the components configured for transmission of acoustic energy into the luminaire. Separation of the components configured for these two functions allows each of them to be optimized for their specific function when compared to conventional luminaires, which may combine the functions by requiring sound energy and light to be transmitted through the optical diffuser. In various embodiments of the present invention, the acoustic aperture or front-facing acoustic aperture may be optimized and configured to maximize the transmission of acoustic energy into the luminaire for subsequent absorption, for example within the luminaire, while the diffuser may be optimized and configure to maximize the transmission of light out of the luminaire. Referring to FIG. 8A, sound waves 270, from within the environment into which acoustic luminaire 800 is placed, incident on luminaire 800 may be transmitted into the interior of luminaire 800, identified in FIG. 8A as cavity 815, through at least two pathways. A first pathway is through optical diffuser 820 and a second pathway is through front-facing acoustic apertures 850. Once the sound waves are inside cavity 815, they may be incident upon the interior surfaces of cavity 815, for example exposed portions 242 of sound-absorbing material 240, illumination elements 230, and the interior walls 880 of luminaire enclosure 810.

In various embodiments of the present invention, front-facing acoustic apertures 850 are configured to provide a relatively high acoustic transmittance pathway for incident sound waves to enter into luminaire cavity 815 where they may be incident upon and absorbed or partially absorbed by sound-absorbing material 240 or by exposed regions 242 of sound-absorbing material 240. In various embodiments of the present invention, front-facing acoustic apertures 850 may be configured to provide significantly higher acoustic transmission than diffuser 820. For example, while the total area of front-facing acoustic apertures 850 may be less than the area of the diffuser 820, the total acoustic transmission through the front-facing acoustic apertures 850 may be greater than through the diffuser 820.

In various embodiments of the present invention, unlike the materials of construction for luminaire enclosure 810 or optical diffuser 820, sound-absorbing material 240 may be chosen for its high sound-absorbing properties, for example a high NRC. In various embodiments of the present invention, sound-absorbing material 240 may have an NRC of at least about 0.6, or at least about 0.75, or at least about 0.8 or at least about 0.9. In various embodiments of the present invention, sound-absorbing material 240 may have a thickness of at least about 3 mm, or at least about 5 mm, or at least about 10 mm, or at least about 25 mm, or at least about 50 mm. In various embodiments of the present invention, larger thicknesses of sound-absorbing material 240 may be utilized to increase the sound-absorption capability of sound-absorbing material 240. In various embodiments of the present invention, sound-absorbing material 240 includes, consists essentially of, or consists of one or more of PET, rockwool, mineral wool, fiberglass, fabric, foam, open cell foam, cotton, aerogel, aerogel mat, or the like.

Unlike conventional acoustic lighting systems, acoustic lighting systems in accordance with embodiments of the present invention provide a relatively high acoustic transmittance pathway, through front-facing acoustic apertures 850, for sound waves incident on the acoustic lighting system to be absorbed by sound-absorbing material 240. This is in addition to the relatively lower acoustic transmittance pathway through optical diffuser 820 of conventional luminaires. As discussed herein, optical diffuser materials typically have relatively low acoustic transmittance because of their materials of construction. This is particularly true for solid or rigid, non-perforated optical diffusers.

This second relatively high acoustic transmittance pathway, combined with the ability to tailor the thickness and characteristics of sound-absorbing material independent of structural or optical requirements, provide for improved sound absorption and the ability to better control undesired sounds or noise.

In various embodiments of the present invention front-facing acoustic apertures 850 may have various shapes, as shown in FIG. 8C. FIG. 8C shows a view of luminaire 801, looking at diffuser 820. Front-facing acoustic apertures may be rectangular (850'), formed in a screen (850"), circular (850), oval (850'") or any other shape. The specific shape of front-facing acoustic apertures 850 is not a limitation of the present invention.

In various embodiments of the present invention the percentage of open area (front-facing acoustic aperture area) may be at least about 10% or at least about 25%, or at least about 50% or at least about 75% of the area in which the front-facing acoustic apertures are positioned.

FIG. 8B shows a cross section through cut line A-A' of luminaire 801 of FIG. 8C. In various embodiments of the present invention, front-facing acoustic apertures 850 may be formed in a component 830 which is made from a different material than diffuser 820. In various embodiments of the present invention, the material of component 830 may include, consist essentially of, or consist of metal, plastic, glass or the like. In various embodiments material 830 may include, consist essentially of, or consist of aluminum, steel, brass, one or more other metals, polyethylene terephthalate (PET), polyester, acrylic, stone, polyvinyl chloride (PVC), acrylonitrile butadiene styrene (ABS), etc.

Front-facing acoustic apertures 850 permit recessed or flush mounting of the lighting system, which may be less effective or not possible with acoustic apertures positioned on the side of the luminaire. Referring to the left side of luminaire 800 in FIG. 8D, ceiling 801 is shown as flush or coplanar or approximately coplanar with diffuser 820 while the right side of luminaire 800 in FIG. 8D shows a partially recessed configuration, in which luminaire 800 is partially recessed into ceiling 802.

Figure 9B:
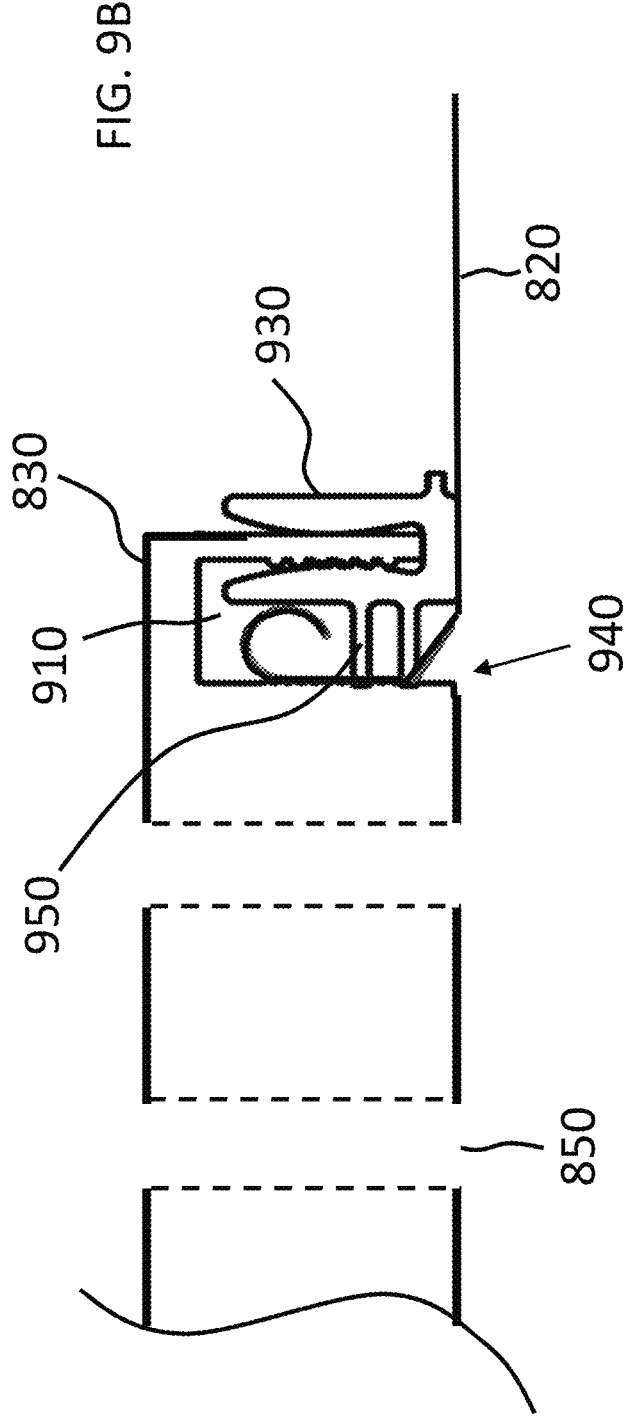

In various embodiments of the present invention, component 830 may incorporate other features, in addition to front-facing acoustic apertures 850. FIG. 9A depicts a cross-sectional view of a portion of an exemplary acoustic lighting system 900 in accordance with embodiments of the present invention, although alternative systems with similar functionality are also within the scope of the invention. In various embodiments, component 830 includes, consists essentially of, or consists of one or more front-facing acoustic apertures 850 and one or more features configured to position or mount or hold diffuser 820. Referring to FIG. 9A, diffuser 820 is shown as a flexible diffuser (for example fabric or PVC) attached to a mounting feature 920 (for example a polymer strips, for example silicone, PVC or the like) that is mounted to the luminaire by fitting mounting feature 920 into slot 910. In various embodiments of the present invention mounting feature 920 may be a silicone strip that is glued or taped or sewn or otherwise attached to diffuser 820, in a configuration known to those skilled in the art as silicone edge graphic (SEG); however, this is not a limitation of the present invention and in other embodiments diffuser 820 may be composed of a different material and mounted to component 830 by other means. In various embodiments diffuser 820 may be a PVC diffuser, component 920 may be a harpoon welded or otherwise attached to diffuser 820 and slot 910 may be configured to receive and hold harpoon 920. FIG. 9B shows component 830 configured to hold gripper 930. Gripper 930 is configured with fingers 950 that hold flexible diffuser 820. In various embodiments of the present invention, flexible diffuser 820 may mounted to component 830 by pushing or tucking diffuser 820 between fingers 950 and a portion of component 830.

FIG. 10A depicts a cross-sectional view of a portion of an exemplary acoustic lighting system 1000 in accordance with embodiments of the present invention, although alternative systems with similar functionality are also within the scope of the invention. In various embodiments, acoustic lighting system 1000 includes, consists essentially of, or consists of one or more light-emitting elements or illumination elements 230 mounted on or in front of a sound-absorbing material 240, which is mounted to surface 1010, acoustic bracket 1020 which is mounted to surface 1030, and diffuser 1040 which is attached to acoustic bracket 1020. In various embodiments of the present invention surface 1010 may be a ceiling; however, this is not a limitation of the present invention and in other embodiments surface 1010 may be a sub-ceiling or a mounting surface constructed for the purpose of this lighting system. In various embodiments of the present invention surface 1030 may be a wall; however, this is not a limitation of the present invention and in other embodiments surface 1030 may be a vertical surface or a mounting surface constructed for the purpose of this lighting system.

FIG. 10B depicts a cross-sectional view of a portion of an exemplary acoustic bracket 1020 in accordance with embodiments of the present invention, although alternative systems with similar functionality are also within the scope of the invention. In various embodiments, acoustic bracket 1020 includes, consists essentially of, or consists of a portion 1050 configured to attach the bracket to a surface, for example a wall or ceiling, an acoustically transparent portion 1053 configured to allow passage of sound energy, and a portion 1055 configured for attachment of diffuser 1040. While FIG. 10B shows portion 1055 configured for attachment of a diffuser using a SEG-type attachment (as discussed in reference to FIG. 9A), this is not a limitation of the present invention and in other embodiments portion 1055 may be configured for different attachment types, for example diffuser tucking (as discussed in reference to FIG. 9B), harpoons, tape, glue grommets, snaps, or any other means of attachment.

In various embodiments of the present invention, the acoustically transparent portion 1053 may include, consist essentially of, or consist of multiple through-holes in the acoustic bracket. In various embodiments the holes may be circular with a diameter of at least about 0.1 mm, or at least about 0.5 mm, or at least about 1 mm, or at least about 5 mm, or at least about 10 mm, or at least about 25 mm. In various embodiments of the present invention, the percentage of the holes in the acoustically transparent portion may be at least about 10%, or at least about 25%, or at least about 50%, or at least about 75% of the total area. In various embodiments of the present invention, acoustic bracket 1020 may be composed of metal, aluminum, extruded aluminum, sheet metal, plastic, PVC or the like.

While FIG. 10A shows acoustic bracket 1020 attached to a vertical surface or a wall, this is not a limitation of the present invention and in other embodiments acoustic bracket 1020 may be attached to other surfaces, for example a horizontal surface or ceiling, as shown in FIG. 10C, which depicts a cross-sectional view of a portion of an exemplary acoustic lighting system 1001 in accordance with embodiments of the present invention, although alternative systems with similar functionality are also within the scope of the invention. While FIG. 10C shows acoustic bracket 1020 attached to a horizontal surface, this is not a limitation of the present invention and in other embodiments the surface may have any orientation.

In various embodiments of the present invention the width of region 1053 may be at least about 12 mm, or at least about 25 mm, or at least 50 mm or at least 100 mm or at least 200 mm.

In various embodiments of the present invention a light-blocking component may be utilized to prevent light from lighting elements 230 exiting the lighting system through acoustic bracket 1020. FIG. 10D depicts a cross-sectional view of a portion of an exemplary acoustic lighting system including acoustic bracket 1020 with light-blocking component 1057 in accordance with embodiments of the present invention, although alternative systems with similar functionality are also within the scope of the invention. In various embodiments, light blocker 1057 may include, consist essentially of, or consist of a an optically opaque, acoustically transparent material configured to allow passage of sound energy and to block completely or substantially the transmission of light. In various embodiments of the present invention, light blocker 1057 may be acoustic foam, felt, fabric, PVC, perforated PVC film, PET or the like. In various embodiments of the present invention light blocker 1057 may be one or more light baffles configured to allow the transmission of sound energy but reduce or eliminate the transmission of light. FIG. 10E shows an example of a baffle-based light blocker 1058. In various embodiments of the present invention, a baffle-based light blocker may include one or more layers of perforated materials. In various embodiments of the present invention, two or more layers of perforated material may be utilized in which each layer has perforations in different positions and/or different size perforations in each layer to reduce or prevent light transmission.

While FIG. 8C and FIGS. 10A-10E depict an acoustic bracket on the edge or periphery of the lighting system, this is not a limitation of the present invention and in other embodiments acoustic brackets may be positioned in the center or anywhere within the lighting system.

Figure 11A:
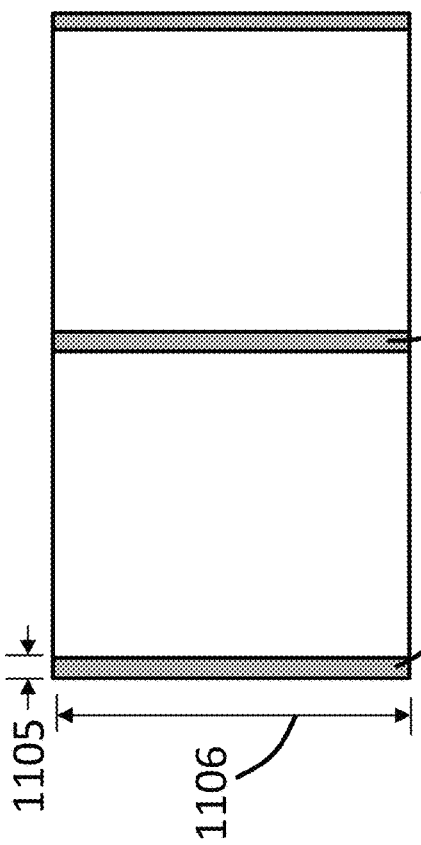
FIGS. 11A-11F are schematic illustrations of acoustic lighting systems in accordance with various embodiments of the present invention.
Figure 11B:
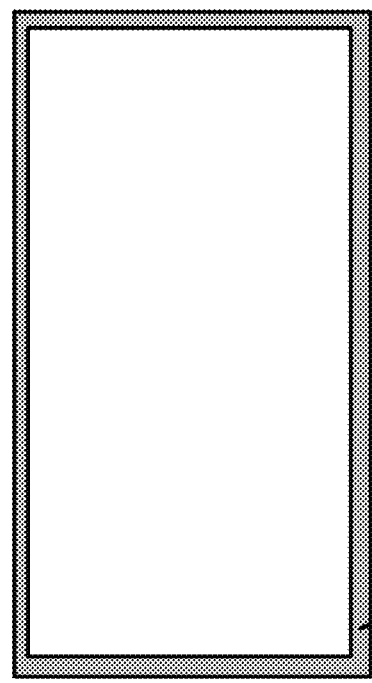
Figure 11C:
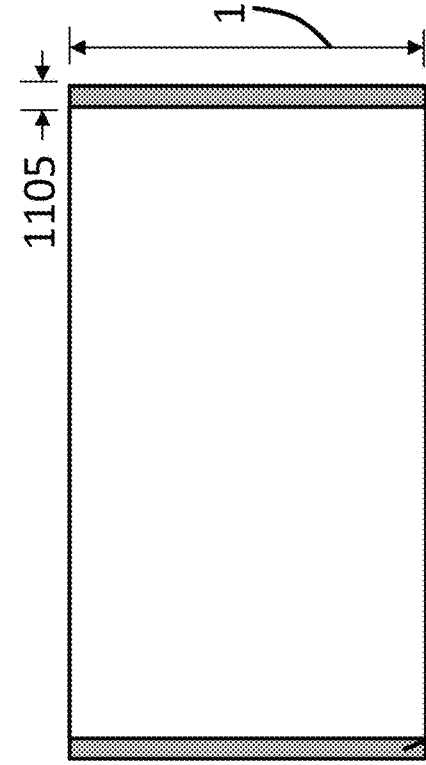
Figure 11D:
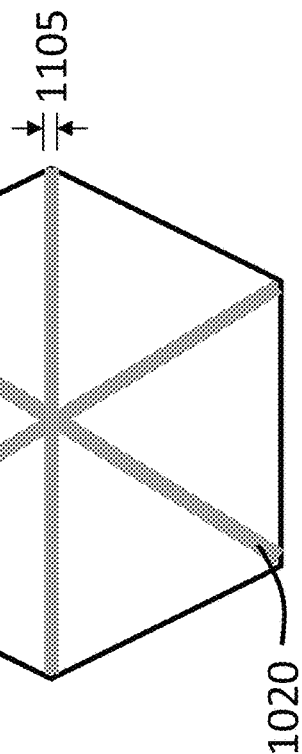

FIGS. 11A-11F show plan views of exemplary acoustic lighting systems 1100. In various embodiments of the present invention the acoustic bracket 1020 may be positioned on all of the edge or periphery of the acoustic lighting system, as shown in FIG. 11A, on a portion of the edges or periphery of the acoustic lighting system, as shown in FIG. 11B, or on a portion of the edges or periphery of the acoustic lighting system and through a portion of the acoustic lighting system (acoustic bracket 1020'), as shown in FIG. 11C. While FIGS. 11A-11C show the acoustic lighting system as a rectangle this is not a limitation of the present invention and in other embodiments acoustic the lighting system may be square, circular, rectangular, or any other shape. While FIGS. 11A-11C show the acoustic lighting system as a planar structure, this is not a limitation of the present invention and in other embodiments the acoustic lighting system may have a three-dimensional shape. FIG. 11D shows a plan view of an exemplary acoustic lighting system having a hexagonal shape.

Figure 11E:
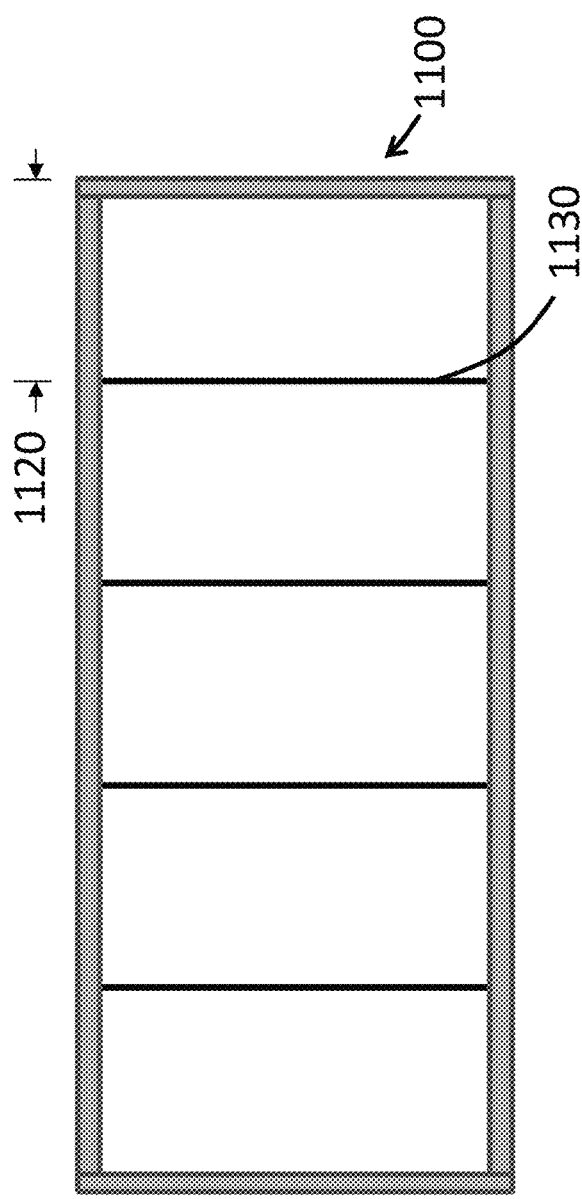
Figure 11F:
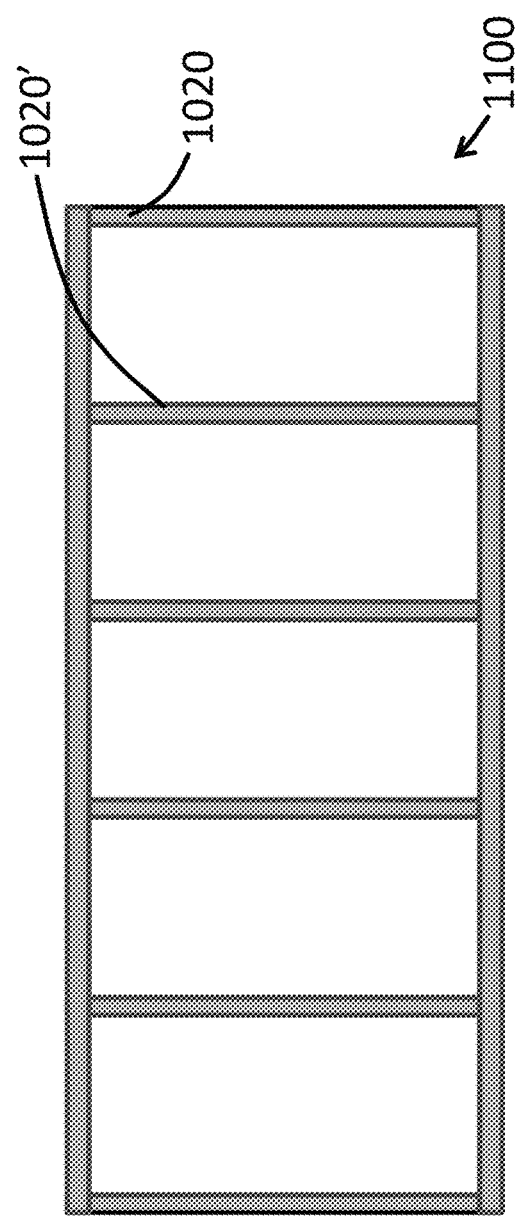

In various embodiments of the present invention, acoustic brackets 1020 may be utilized as a portion of the design or to achieve a desired design or aesthetic look. FIG. 11D shows a plan view of an exemplary acoustic lighting system having a hexagonal shape in which the acoustic brackets divide the hexagon into multiple triangles. FIG. 11E shows a plan view of an exemplary acoustic lighting system having multiple sections, each section having a width identified in the drawing as 1120 and separated by separators or mid-span seams 1130. In various embodiments of the present invention separator or mid-span seam 1130 may be configured to join or support adjacent portions of diffusers. In various embodiments of the present invention width 1120 may be limited by the available size of the diffuser material or be part of the design. FIG. 11F shows a plan view of an exemplary acoustic lighting system having multiple sections, each section having a width identified in the drawing as 1120 and separated by acoustic brackets 1120'. In various embodiments of the present invention acoustic brackets 1120' may add extra area of acoustic transparency to the luminaire structure.

Referring to FIGS. 11B and 11C, acoustic bracket 1020 may have a width 1105 and a length 1106 and an area defined as the product of the length and width of the acoustic bracket. In various embodiments of the present invention, acoustic bracket 1020 may have perforations or through holes with a collective area of at least about 10%, or at least about 25%, or at least about 50%, or at least about 75% of the total area of acoustic bracket 1020.

Figure 12A:
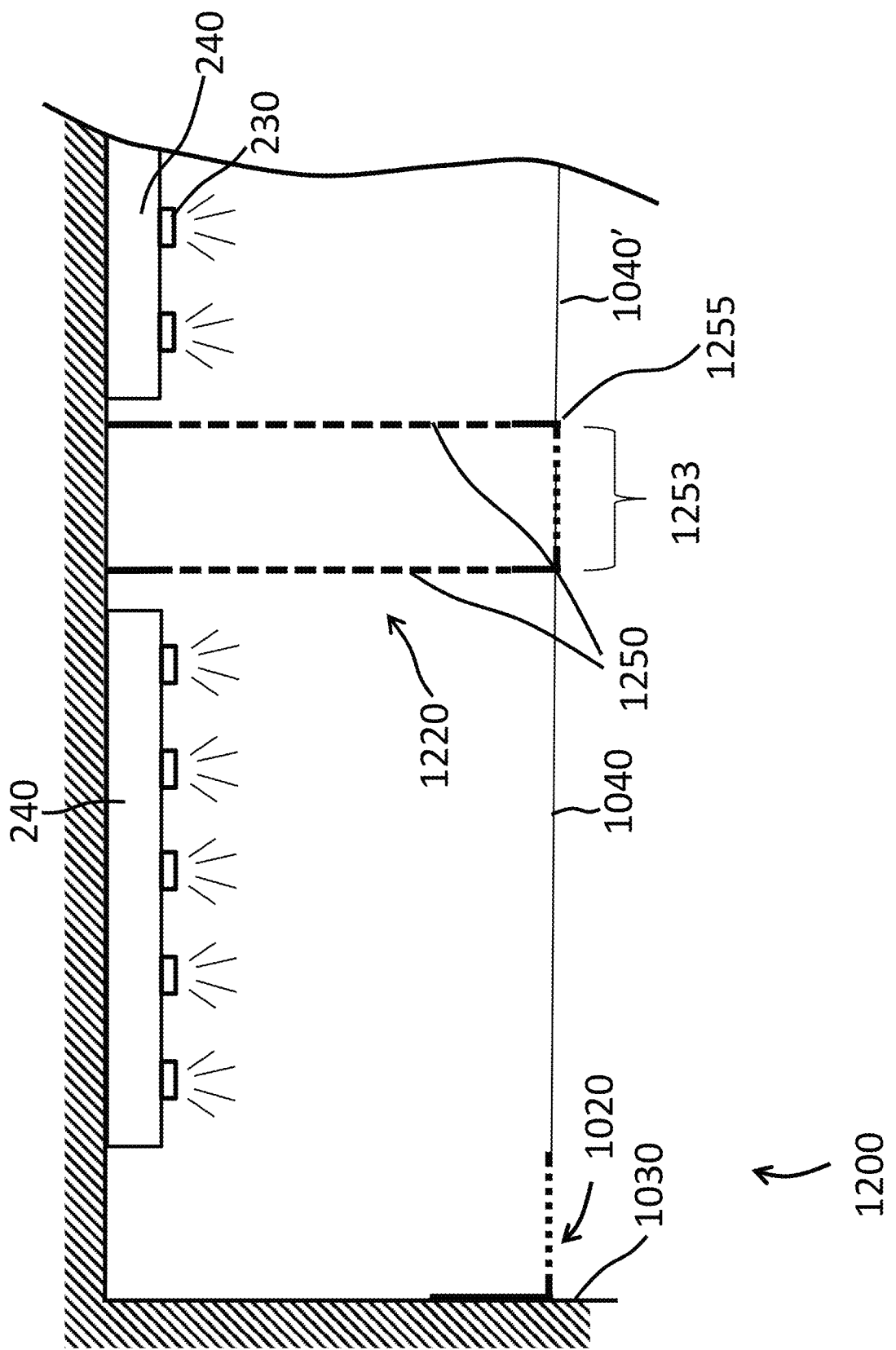

FIG. 12A shows a cross-sectional view of a portion of an exemplary acoustic lighting system 1100 incorporating an acoustic bracket that also serves to divide or separate portions of the acoustic lighting system, in accordance with embodiments of the present invention, although alternative systems with similar alternative systems with similar functionality are also within the scope of the invention. In various embodiments of the present invention, the acoustic bracket may permit joining of two or more sections of diffuser sections (for example diffuser 1040 and diffuser 1040' as shown in FIG. 12A), although alternative systems with similar functionality are also within the scope of the invention. In various embodiments of the present invention acoustic bracket 1220 may include, consist essentially of, or consist of one or more portions 1250 configured to attach the bracket to a surface, for example a wall or ceiling, an acoustically transparent portion 1253 configured to allow passage of sound energy and a portion 1255 configured for attachment of diffuser 1040. In various embodiments of the present invention, portions 1250 may be acoustically transparent or perforated or be formed of acoustically transparent material to allow sound energy incident on portion 1253 to be transmitted into the luminaire cavity and through portions 1250 for subsequent absorption by sound absorption material 240. In various embodiments of the present invention, optional sound absorbing material may be positioned within acoustic bracket 1220 and or 1020, to help prevent light transmission from within the lighting system out through the acoustic bracket and/or to aid in sound absorption. In various embodiments of the present invention attachment portions 1250 may incorporate light baffles or acoustically transparent, optically non-transparent or opaque material to allow sound transmission but reduce or eliminate light transmission out through the acoustic bracket. In various embodiments of the present invention the open area of the acoustic bracket may be at least 5%, at least 10%, at least 25%, at least 50% or at least 75%.

FIG. 12B depicts a cross-sectional view of a portion of an exemplary acoustic bracket 1220 in accordance with embodiments of the present invention, although alternative systems with similar functionality are also within the scope of the invention. In various embodiments, acoustic bracket 1220 includes, consists essentially of, or consists of an acoustically transparent portion 1250 configured to attach the bracket to a surface, for example a wall or ceiling, an acoustically transparent portion 1253 configured to allow passage of sound energy and a portion 1255 configured for attachment of diffuser 1040. In various embodiments of the present invention acoustic bracket 1220 may be used to join two different diffusers (referring to FIG. 12B, diffuser 1040 and diffuser 1040') or as an interface between a diffuser on one side and a different material on the opposite side. While FIG. 12B shows portion 1255 configured for attachment of a diffuser using a harpoon-type attachment (as discussed in reference to FIG. 9A), this is not a limitation of the present invention and in other embodiments portion 1255 may be configured for different attachment types, for example diffuser tucking (as discussed in reference to FIG. 9B), tape, glue grommets, snaps, or any other means of attachment. FIG. 12C shows a magnified view of portion 1255 of acoustic bracket 1220 of FIG. 11B, showing diffuser 1040' and harpoon 1244 which is inserted into slot 1246.

In various embodiments of the present invention, one or more regions of portion 1250 may have optional perforations or be acoustically transparent to allow sound energy incident on portion 1253 to be transmitted through portion 1250 and into the interior of the lighting system. In various embodiments portion 1250 may be composed of metal, plastic, felt, PET or the like.

In various embodiments of the present invention the region within acoustic bracket 1220 (or other types of acoustic brackets) may be partially or fully populated with sound absorption material. Referring to FIG. 12D, sound absorption material 1260 may be positioned within acoustic bracket 1220 to provide absorption of sound energy transmitted through portion 1253. In various embodiments of the present invention sound absorption material 1260 may be configured in multiple pieces to provide increased area for sound absorption.

In various embodiments of the present invention the width of region 1153 may be at least about 12 mm, or at least about 25 mm, or at least 50 mm or at least 100 mm or at least 200 mm.

In various embodiments of the present invention the diffuser (for example diffuser 1040 in FIG. 12A or diffuser 820 in FIG. 8D) may include, consist essentially of, or consist of a flexible fabric, a flexible film or membrane, a rigid diffuser or the like. In various embodiments of the present invention the diffuser (for example diffuser 1040 in FIG. 12A or diffuser 820 in FIG. 8D) may include, consist essentially of, or consist of polyester, acrylic, polycarbonate, PVC, glass, wool or the like.

In various embodiments of the present invention, the diffuser of an acoustic lighting system may be translucent or may be any color. In various embodiments of the present invention the diffuser of an acoustic lighting system may have a matte finish, a lacquer or shiny finish, a satin finish or any other finish. In various embodiments of the present invention the diffuser cover of an acoustic lighting system may be reflective, for example may have a mirror finish. In various embodiments of the present invention a portion or all of the diffuser of an acoustic lighting system may non-porous or may not have any openings, however this is not a limitation of the present invention and in other embodiments the diffuser of an acoustic lighting system may have one or more openings or perforations. In various embodiments the perforations or holes may be circular or essentially circular and have a diameter in the range of about 0.05 mm to about 0.5 mm and have a density in the range of about 50,000 to about 1,000,000 perforations per square meter. In various embodiments of the present invention, the perforations or holes may have any shape with an area equivalent to a circle having a diameter in the range of about 0.05 mm to about 0.5 mm and have a density in the range of about 50,000 to about 1,000,000 perforations per square meter.

While the above discussion is mainly in reference to thin flexible diffusers such as constructed of PVC, fabric, PET or the like, perforated diffusers may also be rigid diffusers such as acrylic, polycarbonate, glass, stone or the like. FIG. 13A depicts a cross-sectional view of a portion of an exemplary acoustic lighting system 1300 in accordance with embodiments of the present invention, although alternative systems with similar functionality are also within the scope of the invention. In various embodiments, acoustic lighting system 1300 includes lighting elements 230, sound absorption material 240 and a perforated rigid diffuser 1320. The perforations or holes in perforated rigid diffuser 1320 may be made by punching, drilling, laser drilling, water cutting or other suitable methods. In various embodiments of the present invention the holes may have a diameter (or lateral dimension—it is understood that herein, references to "diameter" encompass one or more lateral dimensions (e.g., the largest lateral dimensions) of non-circular shapes) of at least about 0.5 mm, or at least about 0.1 mm, or at least about 1 mm, or at least about 5 mm. In various embodiments of the present invention the perforated rigid diffuser may have a thickness of at least about 1 mm, or at least about 3 mm, or at least about 5 mm or at least about 10 mm. In various embodiments of the present invention the ratio of the thickness of perforated rigid diffuser 1320 and the diameter of the perforations may be configured so that lighting elements 230 are not visible to an observer looking at perforated rigid diffuser 1320. In various embodiments of the present invention an optional diffuser, which may be perforated or not, may be positioned between lighting elements 230 and perforated rigid diffuser 1320 to prevent viewing of lighting elements 230 from the outside of the lighting system. The perforations or holes in perforated rigid diffuser 1320 may be made by punching, drilling, laser drilling, water cutting or other suitable methods. In various embodiments of the present invention the holes may have a diameter of at least about 0.5 mm, or at least about 0.1 mm, or at least about 1 mm, or at least 5 mm.

FIG. 13B depicts a cross-sectional view of a portion of an exemplary acoustic lighting system 1301 in accordance with embodiments of the present invention, although alternative systems with similar functionality are also within the scope of the invention. In various embodiments, acoustic lighting system 1301 is an edge-lit acoustic lighting system and includes lighting elements 1360, sound absorption material 240, perforated waveguide 1340. In various embodiments of the present invention optional perforated mirror 1370 may be positioned between sound absorbing material 240 and perforated optical waveguide 1360 to aid in reflectance of light within the waveguide and increase the efficacy of the lighting system. In various embodiments of the present invention light from lighting elements 1360 may be optically coupled into perforated optical waveguide 1340 and internally reflected as shown by schematic light rays 1350 and 1352. Light incident on the outer face 1345 of perforated optical waveguide 1340 may be reflected back into perforated optical waveguide 1340 or may be extracted or scattered or otherwise be caused to exit the waveguide as light 1358, in accordance with the operation of edge-lit panels, which is understood by those skilled in the art. In various embodiments of the present invention the perforations or holes in perforated optical waveguide 1340 may act as scattering or extraction elements. In various embodiments of the present invention sound energy incident on outer face 1345 may pass through the perforations or holes and be absorbed or partially absorbed by sound absorption material 240. In various embodiments of the present invention the distribution of holes in perforated optical waveguide 1340 may be uniform, for example having a fixed distance or pitch between each hole or perforation; however, this is not a limitation of the present invention and in other embodiments the distribution of holes or perforations may be non-uniform or arbitrary or random.

The tables below show a comparison of the relative effectiveness of diffuser perforation compared to the use of acoustic brackets. The relative effectiveness is determined by the open area in each component; the open area permits transmission of acoustic sound energy into the lighting system, where it may be absorbed.

Table 1 shows the total open area for three different size acoustic lighting systems utilizing a perforated diffuser, for example PVC, with a perforation hole diameter of about 0.15 mm and a perforation density of about 500,000 per square meter, which is on the high side of typically available perforation densities. Examples 3b and 3c show the same information as the acoustic lighting system in Example 3a, but with different perforation density and diameter. In these examples the uninterrupted width or the smaller dimension is limited to about 5 m, as this is typically the maximum width that is available for diffusers such as fabric or PVC. When wider spans are required, these are typically achieved using multiple sections, as described in reference to FIG. 11E, which schematically represents the situation for Example 3 in Table 1. Example 3 has a length of about 25 m and a width of about 15 m and is broken up into 5 sections, each having dimensions of about 15 m by about 5 m. For these examples the percentage of perforation area (that is area for transmission of sound energy) to the total luminaire area is in the range of about 0.2% to about 3.5%.

TABLE 1

| Dimension | Units | Example 1 | Example 2 | Example 3a | Example 3b | Example 3c |
| --- | --- | --- | --- | --- | --- | --- |
| Lighting system length | m | 10 | 50 | 25 | 25 | 25 |
| Lighting system width | m | 5 | 5 | 15 | 15 | 15 |
| Lighting system area | m2 | 50 | 250 | 375 | 375 | 375 |

TABLE 1-continued

| Dimension | Units | Example 1 | Example 2 | Example 3a | Example 3b | Example 3c |
|---|---|---|---|---|---|---|
| Perforation diameter | mm | 0.15 | 0.15 | 0.15 | 0.3 | 0.1 |
| Perforation density | per m2 | 500,000 | 500,000 | 500,000 | 500,000 | 250,000 |
| Total perforation area | mm2 | 441,786 | 2,208,932 | 3,313,399 | 13,253,594 | 736,311 |
| Perforation area/Lighting system area | % | 0.9% | 0.9% | 0.9% | 3.5% | 0.2% |

Table 2 below shows the same acoustic lighting system examples as described in Table 1, but instead of a perforated diffuser they are configured with acoustic brackets on the edge or periphery of the luminaire Table 2 shows that the total open area in the acoustic bracket may be made to be about equal the total open area of the perforated diffuser, using different values of the acoustic bracket width and percentage of open area. In Table 2, all the examples include acoustic brackets around the edge of the acoustic lighting system, for example as described in reference to FIG. 11E, whereas Example 3b' also includes two (2) additional crosspieces as described in reference to FIG. 11F.

TABLE 2

| Acoustic Bracket at edge | Units | Example 1 | Example 2 | Example 3 | Example 3b | Example 3c | Example 3b' |
|---|---|---|---|---|---|---|---|
| Lighting system length | m | 10 | 50 | 25 | 25 | 25 | 25 |
| Lighting system width | m | 5 | 5 | 15 | 15 | 15 | 15 |
| Lighting system area | m2 | 50 | 250 | 375 | 375 | 375 | 375 |
| Acoustic bracket width | m | 0.05 | 0.05 | 0.05 | 0.2 | 0.02 | 0.14 |
| Optical diffuser area | m2 | 48.5 | 244.5 | 371.0 | 359.2 | 373.4 | 359.6 |
| Acoustic bracket area | m2 | 1.5 | 5.5 | 4 | 16 | 1.6 | 15.4 |
| % Open Area in Bracket | % | 30% | 40% | 80% | 80% | 50% | 80% |
| Total acoustic opening area | m2 | 0.45 | 2.20 | 3.20 | 12.80 | 0.80 | 12.29 |
| Total acoustic opening area/ Optical diffuser area | % | 0.93% | 0.90% | 0.86% | 3.56% | 0.21% | 3.42% |

In various embodiments of the present invention the percentage of the total open area in the acoustic aperture relative to the optical diffuser area may be in the range of about 0.1% to about 5%, or in the range of about 0.2% to about 2%; however, this is not a limitation of the present invention because open area in an acoustic aperture does not have the same limitations as perforations in an optical diffuser. Optical diffuser perforation size, for example diameter of the perforations, may be limited by aesthetic factors, for example larger holes in the optical diffuser may not be visually pleasing or acceptable or larger holes may permit visualization or partial visualization of the individual illumination elements, resulting in undesirable visual characteristics, for example visibility of multiple bright spots of light through the perforations. The density of perforations in an optical diffuser may be limited by similar visual aspects or by material characteristics, for example the required mechanical strength or structure may be adversely affected if the density of perforations is increased. In various embodiments of the present invention the acoustic aperture, because it does not have to perform one or more functions of the optical diffuser, in particular homogeneous diffusion of the light, it may not be subject to the same limitations. In addition, multiple acoustic apertures may be utilized, for example as discussed in reference to FIGS. 11A to 11F or FIGS. 15A to 15G. Therefore, the percentage of the total open area in the acoustic aperture relative to the optical diffuser area may be larger than the percentage of perforation area (that is area for transmission of sound energy) to the total luminaire area, for example at least 0.5%, at least 1%, at least 3%, at least 5% or at least 10%.

In various embodiments of the present invention an acoustic aperture may not be an open area (e.g., an empty or hollow opening), for example a through-hole, but may be configured as a material with a relatively high acoustic transmission value. In such cases the above ratio may be modified by replacing the total open area of the acoustic aperture by the total area of the acoustic aperture divided by its acoustic transmission value. While the discussion related to Tables 1 and 2 is for rectangular acoustic lighting systems, this is not a limitation of the present invention and in various embodiments acoustic lighting systems may have different shapes, for example a circle, square, triangle, diamond or any arbitrary shape.

Figure 14:
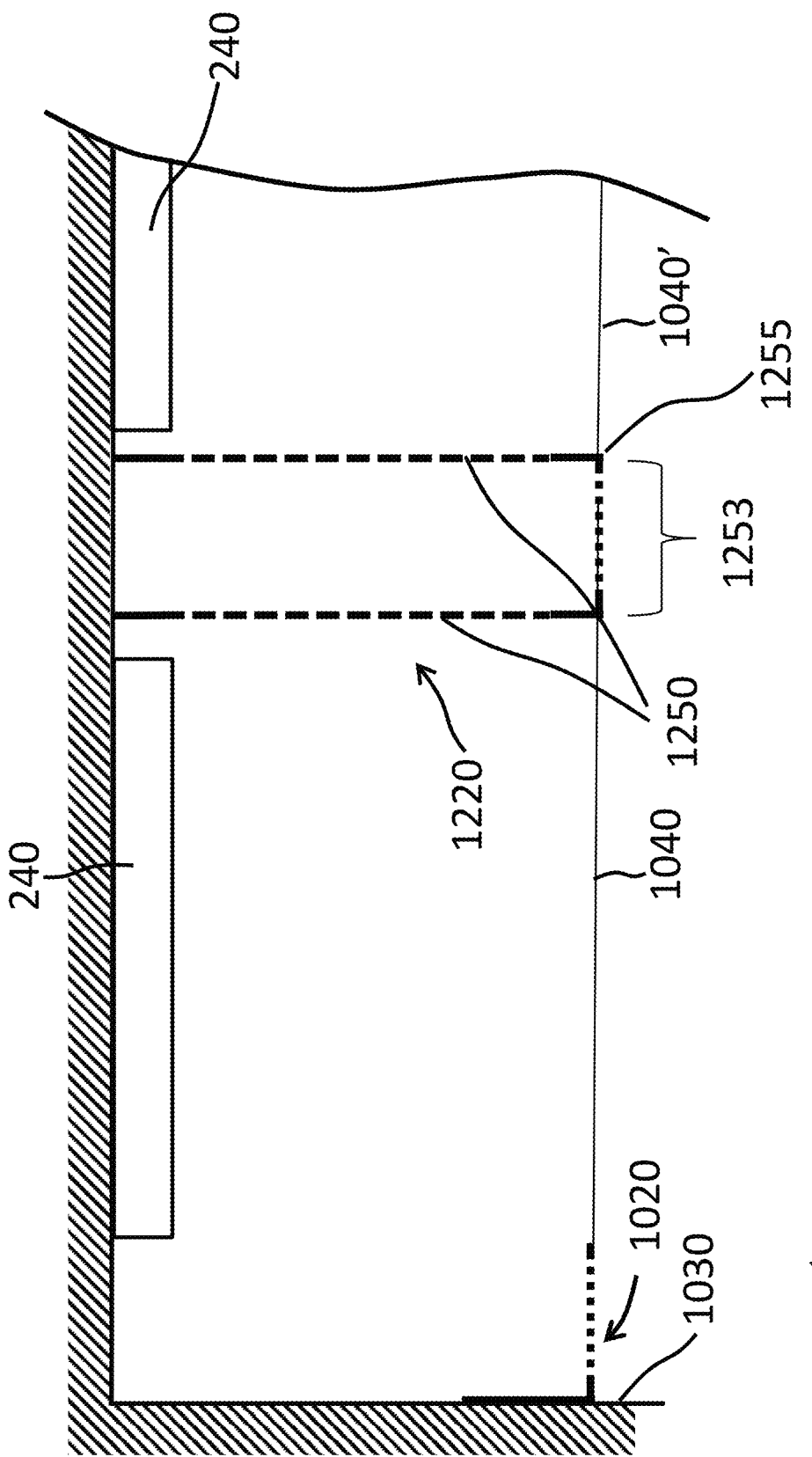
FIG. 14 is a schematic illustration of a portion of an acoustic system in accordance with various embodiments of the present invention.

While the previous discussion has been with respect to acoustic lighting systems, embodiments of the present invention may also include acoustic system without lighting or illumination. FIG. 14 shows a cross-sectional view of a portion of an exemplary acoustic system 1400 incorporating acoustic bracket 1020 and acoustic bracket 1220 in accordance with embodiments of the present invention, although alternative systems with similar alternative systems with similar functionality are also within the scope of the invention. Referring to FIGS. 12A and 14, the acoustic system 1400 of FIG. 14 is similar to the acoustic lighting system of FIG. 12A with the exception of the lighting components. In various embodiments of the present invention, all the features discussed in reference to acoustic lighting systems, with the exception of the lighting components, may be applied to acoustic systems. For example the discussion with respect to FIGS. 11A-11F may also be applied to acoustic systems that do not include lighting.

In various embodiments of the present invention perforated diffusers and acoustic brackets may be combined to further increase the acoustic transparency of the acoustic lighting system, to further increase its sound absorption capability.

In various embodiments of the present invention, the diffuser of an acoustic system may have low optical transmittance or may be opaque. In other words, the diffuser may serve the function of covering the interior region of the system, but may be opaque. In various embodiments of the present invention the diffuser cover of an acoustic system may be white or black or have any color. In various embodiments of the present invention the diffuser cover of an acoustic system may have a matte finish, a lacquer or shiny finish, a satin finish or any other finish. In various embodiments of the present invention the diffuser cover of an acoustic system may be reflective, for example may have a mirror finish. In various embodiments of the present invention a portion or all of the diffuser cover of an acoustic system may non-porous or may not have any openings; however, this is not a limitation of the present invention and in other embodiments the diffuser cover of an acoustic system may have one or more openings or perforations. In various embodiments the perforations or holes may be circular or essentially circular and have a diameter in the range of about 0.05 mm to about 0.5 mm and have a density in the range of about 50,000 to about 1,000,000 perforations per square meter. In various embodiments of the present invention, the perforations or holes may have any shape with an area equivalent to a circle having a diameter in the range of about 0.05 mm to about 0.5 mm and have a density in the range of about 50,000 to about 1,000,000 perforations per square meter.

While the previous discussion has mainly been in reference to holes perforations in diffusers having a diameter and circular shape, this is not a limitation of the present invention and in various embodiments of the present invention the perforations or holes may be square, rectangular, triangular or have any other shape or an arbitrary shape.

While the previous discussion has mainly been in reference to a uniformly distributed density of perforations or holes, for example a constant distance or pitch between each hole or perforation, this is not a limitation of the present invention and in other embodiments the holes or perforations may not be uniformly distributed, or may have an arbitrary or random distribution.

Figure 15A:
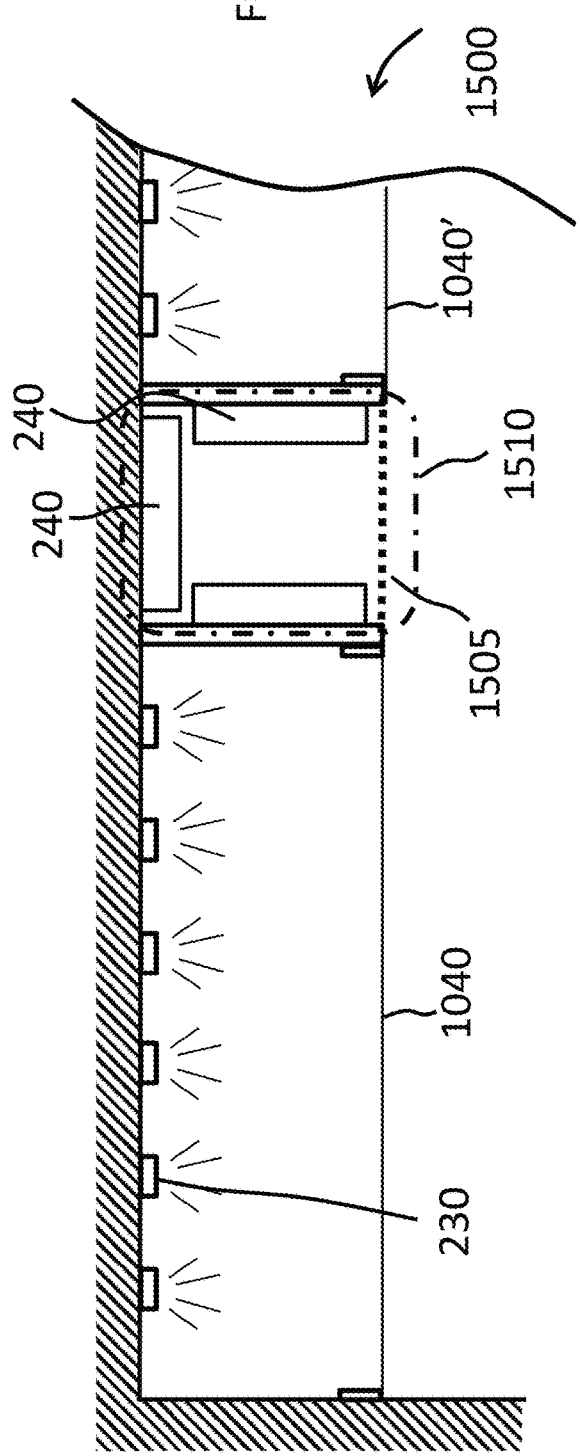
FIGS. 15A-15F show portions of acoustic lighting systems in accordance with various embodiments of the present invention.
Figure 15B:
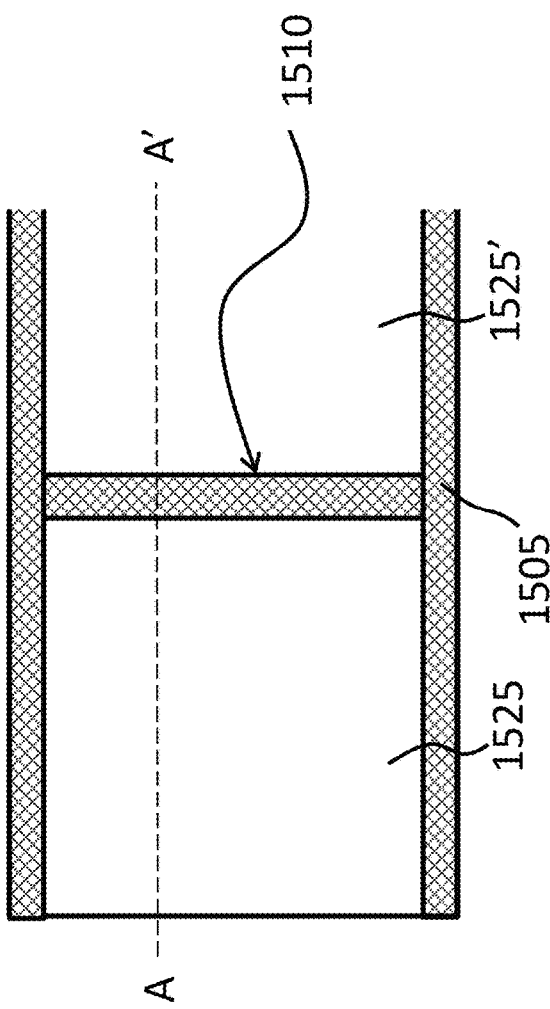

FIG. 15A shows a cross-sectional view of a portion of an exemplary acoustic lighting system through cut line A-A' of acoustic lighting system 1500 of FIG. 15B in accordance with embodiments of the present invention, although alternative systems with similar functionality are also within the scope of the invention. In various embodiments, acoustic lighting system 1500 includes, consists essentially of, or consists of one or more area illumination units, for example area illumination units 1525 and 1525' shown in FIG. 15B, configured to provide area illumination, and one or more sound absorbing units 1510 configured to absorb sound from the environment in which acoustic lighting system 1500 is placed.

Referring to FIG. 15A, in various embodiments of the present invention area illumination units may be configured to provide illumination, for example area illumination units 1525 may include, consist essentially of, or consist of one or more illumination units 230 and optical diffuser 1040. In various embodiments of the present invention illumination units 230 and optical diffuser 1040 may be optimized to provide high quality illumination, for example high efficacy, high color rendering index (CRI) or the like, such features of high-quality lighting systems are known to those skilled in the art, without the need to accommodate components or design features required for sound absorption as this function is provided by separate sound absorption units 1510.

In various embodiments of the present invention sound absorption units 1510 may include, consist essentially of, or consist of one or more sound absorption materials 240 and an optional cover 1505. In various embodiments of the present invention sound absorption unit 1510 may include an optical cover 1505 having a relatively high transmission value for sound energy and in various embodiments of the present invention, may have similar characteristics to those of portion 1253 of acoustic bracket 1220 as described in reference to FIGS. 12A-12C. In various embodiments of the present invention sound absorbing unit 1510 may be configured without optional cover 1510. While FIG. 15A shows sound absorption unit 1510 having three portions or pieces of sound absorbing material 240, this is not a limitation of the present invention and in other embodiments fewer or more than three portions or pieces of sound absorbing material 240 may be utilized in sound absorbing unit 1510. The position of sound absorbing material 240 in sound absorbing unit 1510 is not a limitation of the present invention.

While FIGS. 15A and 15B show two area illumination units 1525 and 1525' this is not a limitation of the present invention and in other embodiments the number of illumination units may be different, for example one or three or more illumination units. While FIG. 15B shows three sound absorption units 1510 this is not a limitation of the present invention and in other embodiments the number of sound absorption units may be different, for example one or two or four or more sound absorption units. While FIG. 15B shows sound absorption units positioned on a portion of the periphery of the acoustic lighting system and positioned to separate different area illumination units this is not a limitation of the present invention and in other embodiments the number and positioning of the sound absorption units may be different.

Figure 15C:
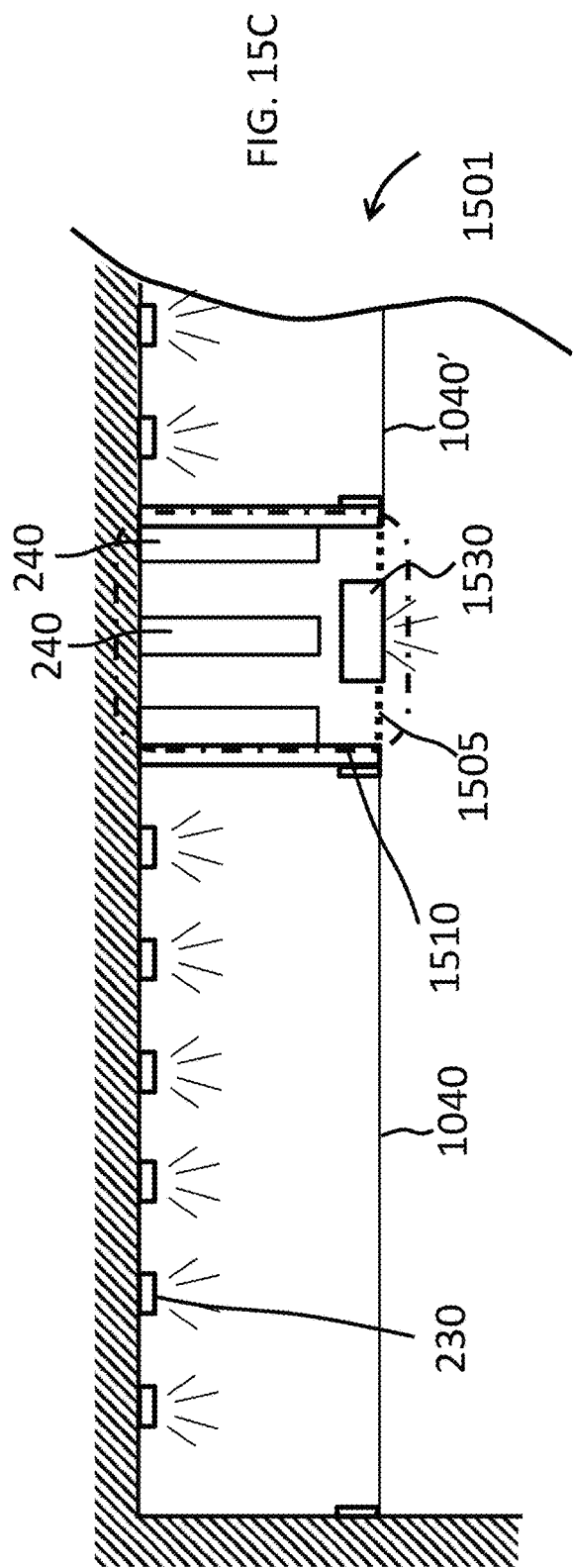
Figure 15D:
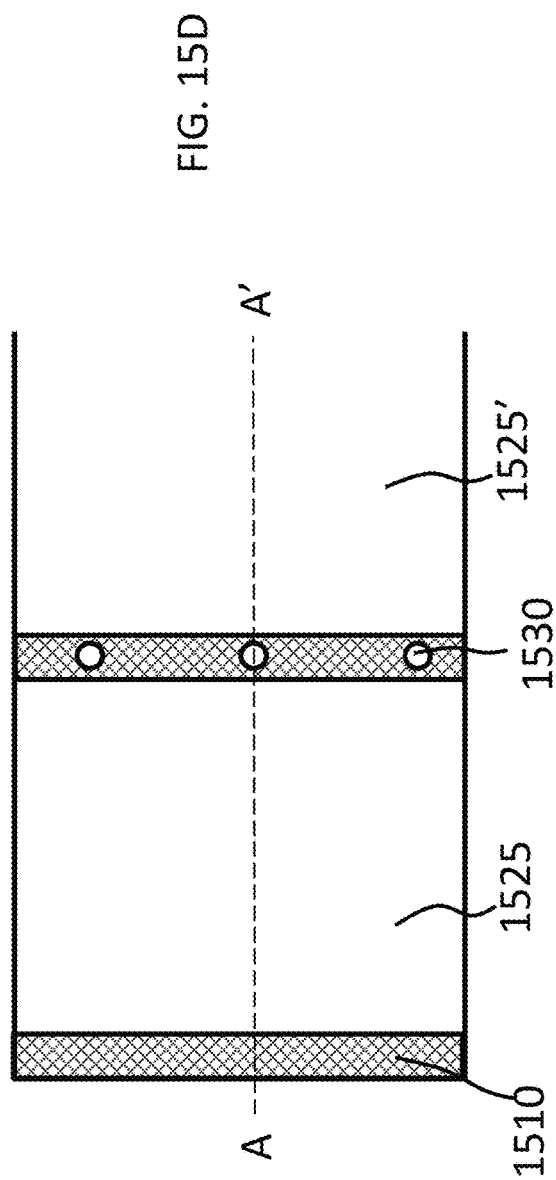

FIG. 15C shows a cross-sectional view of a portion of an exemplary acoustic lighting system through cut line A-A' of acoustic lighting system 1501 of FIG. 15D in accordance with embodiments of the present invention, although alternative systems with similar functionality are also within the scope of the invention. In various embodiments, acoustic lighting system 1501 includes, consists essentially of, or consists of one or more area illumination units, for example area illumination units 1525 and 1525' shown in FIG. 15D, configured to provide area illumination, and one or more sound absorbing units 1510 configured to absorb sound from the environment in which acoustic lighting system 1500 is placed.

Figure 15E:
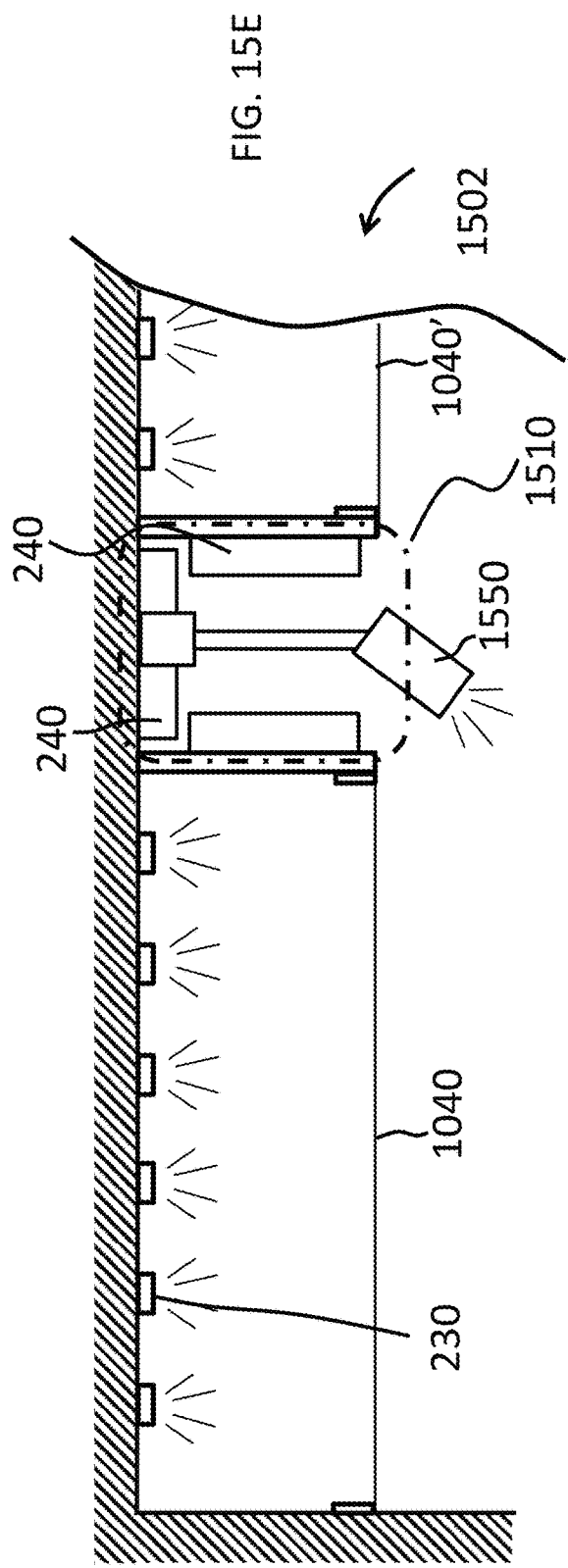
Figure 15F:
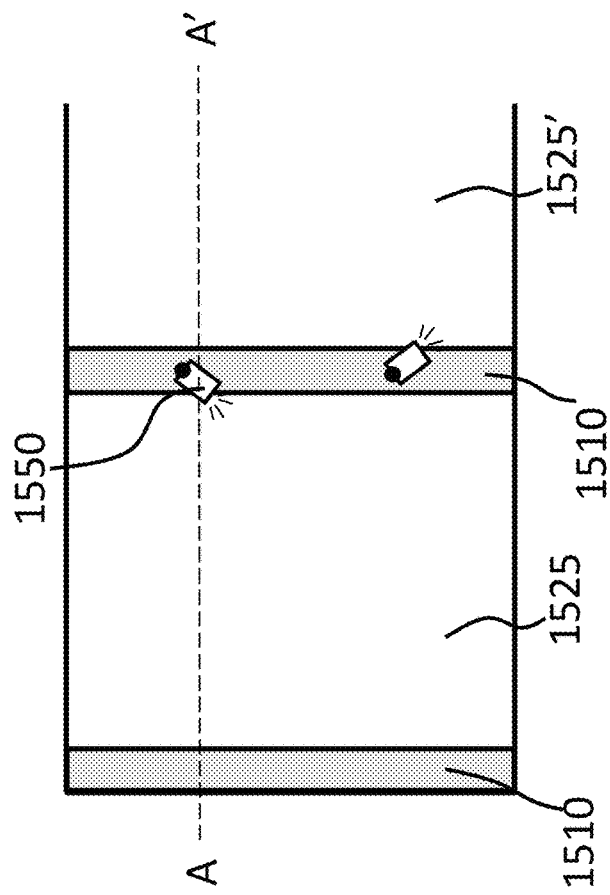

Referring to FIG. 15C, in various embodiments of the present invention area illumination units may be configured to provide illumination, for example area illumination units 1525 may include, consist essentially of, or consist of one or more illumination units 230 and optical diffuser 1040. In various embodiments of the present invention illumination units 230 and optical diffuser 1040 may be optimized to provide high quality illumination, for example high efficacy, high color rendering index (CRI) or the like, such features of high-quality lighting systems are known to those skilled in the art, without the need to accommodate components or design features required for sound absorption as this function is provided by separate sound absorption units 1510. In various embodiments of the present invention sound absorption units 1510 may include, consist essentially of, or consist of one or more sound absorption materials 240 and an optional cover 1505 and optional ceiling elements 1530 that may be configured for ceiling mounting. For example in various embodiments of the present invention optional ceiling elements 1530 may include spot lights, track lights, linear lights, wall washer lights, cameras, fire sprinkler heads, microphones, air conditioning or heater ducts, wireless radio access points or the like. FIGS. 15E and 15F show cross-sectional and plan views of portions of an exemplary acoustic lighting system 1502 incorporating track lights 1550. Referring to FIG. 15E, sound absorption unit 1510 is shown without optional cover 1505.

In various embodiments of the present invention sound absorption unit 1510 may include an optical cover 1505 having a relatively high transmission value for sound energy and in various embodiments of the present invention, may have similar characteristics to those of portion 1253 of acoustic bracket 1220 as described in reference to FIGS. 12A-12C. In various embodiments of the present invention sound absorbing unit 1510 may be configured without optional cover 1510. While FIG. 15C shows sound absorption unit 1510 having three portions or pieces of sound absorbing material 240 this is not a limitation of the present invention and in other embodiments fewer or more than three portions or pieces of sound absorbing material 240 may be utilized in sound absorbing unit 1510. The position of sound absorbing material 240 in sound absorbing unit 1510 is not a limitation of the present invention.

While FIGS. 15C and 15D show two area illumination units 1525 and 1525' this is not a limitation of the present invention and in other embodiments the number of illumination units may be different, for example one or three or more illumination units. While FIG. 15D shows two sound absorption units 1510 this is not a limitation of the present invention and in other embodiments the number of sound absorption units may be different, for example one or three or four or more sound absorption units. While FIG. 15D shows sound absorption units positioned on a portion of the periphery of the acoustic lighting system and positioned to separate different area illumination units this is not a limitation of the present invention and in other embodiments the number and positioning of the sound absorption units may be different.

Figure 15G:
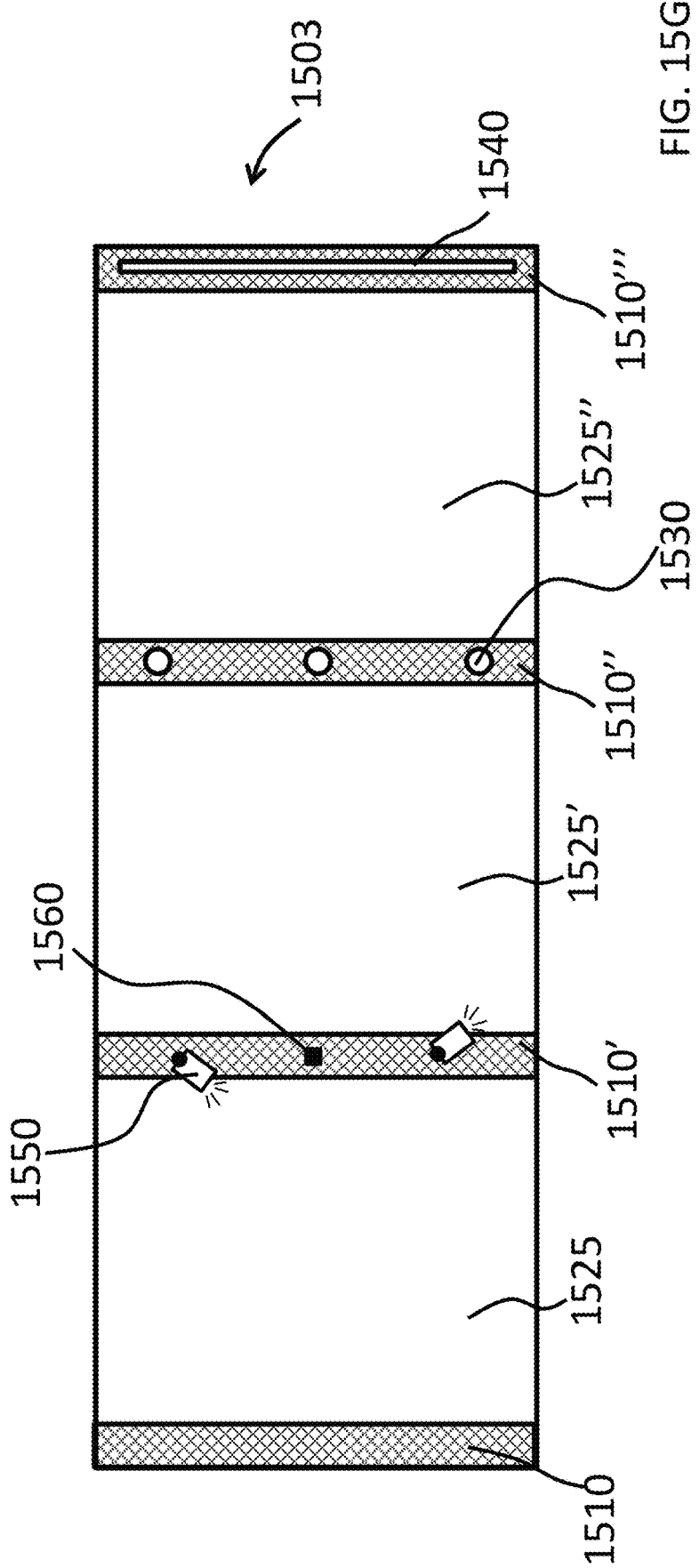
FIG. 15G shows a plan view of an acoustic lighting systems in accordance with various embodiments of the present invention.

FIG. 15G shows a plan view of an exemplary acoustic lighting system 1504 in accordance with embodiments of the present invention, although alternative systems with similar functionality are also within the scope of the invention. In various embodiments, acoustic lighting system 1503 includes, consists essentially of, or consists of one or more area illumination units, for example area illumination units 1525, 1525' and 1525" shown in FIG. 15G, configured to provide area illumination, and one or more sound absorbing units 1510 configured to absorb sound from the environment in which acoustic lighting system 1500 is placed. Referring to FIG. 15G, sound absorption units 1510 also include additional ceiling features, for example sound absorption unit 1510' incorporates track lights 1550 and camera 1560, sound absorption unit 1510" incorporates spot lights 1530, and sound absorption unit 1510'" incorporates wall washer light 1540; however, this is not a limitation of the present invention and in other embodiments other configurations of ceiling elements, optional covers and other elements or configurations are within the scope of the present invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An acoustic lighting system comprising:
a luminaire enclosure;
a first sound-absorbing material disposed within at least a portion of the luminaire enclosure, and having first and second opposing surfaces;
a plurality of light-emitting elements disposed over at least a portion of the first surface of the first sound-absorbing material within the lighting system enclosure and spaced apart from each other such that the first sound-absorbing material is exposed through gaps between the light-emitting elements; and
at least one optical diffuser spaced apart from the light-emitting elements,
wherein the luminaire enclosure has (i) at least one opening over which the at least one optical diffuser is disposed and (ii) at least one acoustic aperture not occluded by the at least one optical diffuser, and
wherein the at least one acoustic aperture is aligned to prevent a line of sight to the plurality of light-emitting elements from outside the luminaire enclosure.

2. The acoustic lighting system of claim 1, wherein:
the light-emitting elements are disposed on a substrate; and
the substrate defines a plurality of openings between the light-emitting elements,
wherein the first sound-absorbing material is exposed through the openings.

3. The acoustic lighting system of claim 2, wherein the substrate is flexible.

4. The acoustic lighting system of claim 1, wherein at least one said acoustic aperture has an acoustic transmission greater than 25%.

5. The acoustic lighting system of claim 1, wherein at least one said acoustic aperture has an acoustic transmission greater than 50%.

6. The acoustic lighting system of claim 1, wherein the at least one optical diffuser has an optical transmissivity greater than 25% for a wavelength of light emitted by at least one of the light-emitting elements.

7. The acoustic lighting system of claim 1, wherein the first sound-absorbing material comprises at least one of fiberglass, sound-absorbing foam, mineral wool, mineral fiber, acoustic fleece, polyester, polyester felt, polyethylene terephthalate, acoustic ceiling tile, or fiberglass foam.

8. The acoustic lighting system of claim 1, wherein the at least one acoustic aperture is configured to prevent passage of light from within the lighting enclosure.

9. The acoustic lighting system of claim 1, wherein the at least one acoustic aperture comprises an array of through-holes.

10. The acoustic lighting system of claim 9, wherein (i) the at least one optical diffuser has a first area, (ii) the at least one acoustic aperture has a second area comprising a total area of all through-holes, and (iii) a percentage ratio of the second area to the first area is at least 0.2%.

11. The acoustic lighting system of claim 9, wherein (i) the at least one optical diffuser has a first area, (ii) the at least one acoustic aperture has a second area comprising a total area of all through-holes, and (iii) a percentage ratio of the second area to the first area is at least 1%.

12. The acoustic lighting system of claim 9, wherein (i) the at least one optical diffuser has a first area, (ii) the at least one acoustic aperture has a second area comprising a total area of all through-holes, and (iii) a percentage ratio of the second area 25 to the first area is within the range of about 0.1% to about 5%.

13. The acoustic lighting system of claim 9, wherein (i) the at least one optical diffuser has a first area, (ii) the at least one acoustic aperture has a second area comprising a total area of all through-holes, and (iii) a percentage ratio of the second area to the first area is within the range of about 0.2% to about 2%.

14. The acoustic lighting system of claim 9, wherein the at least one acoustic aperture comprises (i) a total surface area comprising (a) a total area comprising a sum of areas of all of the through-holes and (b) a total area of the acoustic aperture less the sum of areas of all of the through-holes and (ii) a percentage ratio of the sum of the areas of all of the through-holes to the total area of the acoustic aperture less the sum of areas of all of the through-holes is at least 25%.

15. The acoustic lighting system of claim 9, wherein the at least one acoustic aperture comprises (i) a total surface area comprising (a) a total area comprising a sum of areas of all of the through-holes and (b) a total area of the acoustic aperture less the sum of areas of all of the through-holes and (ii) a percentage ratio of the sum of the areas of all of the through-holes to the total area of the acoustic aperture less the sum of areas of all of the through-holes is at least 50%.

16. The acoustic lighting system of claim 1, wherein at least one acoustic aperture is coplanar with the optical diffuser.

17. The acoustic lighting system of claim 1, wherein the at least one acoustic aperture is configured for mounting or attachment of at least a portion of the at least one optical diffuser.

18. The acoustic lighting system of claim 16, wherein (i) the at least one acoustic aperture has a first side and a second side opposite the first side, (ii) at least a portion of the first side is configured for mounting or attachment of at least a portion of the at least one optical diffuser, and (iii) at least a portion of the second side is configured for attachment or mounting to at least one of a wall or ceiling.

19. The acoustic lighting system of claim 16, wherein (i) the at least one optical diffuser comprises at least a first portion and a second portion, (i) the at least one acoustic aperture has a first side and a second side opposite the first side, (iii) at least a portion of the first side is configured for mounting or attachment of at least a portion of the first portion, and (iv) at least a portion of the second side is configured for mounting or attachment of at least a portion of the second portion.

20. The acoustic lighting system of claim 1, wherein at least a portion of the at least one acoustic aperture is configured to be attached to a wall or another vertical surface.

21. The acoustic lighting system of claim 1, wherein at least a portion of the at least one acoustic aperture is configured to be attached to a ceiling or another horizontal surface.

22. The acoustic lighting system of claim 1, further comprising a second sound-absorbing material positioned behind the at least one acoustic aperture.

23. The acoustic lighting system of claim 22, wherein the second sound-absorbing material is positioned substantially perpendicular to the face of the at least one acoustic aperture.

24. The acoustic lighting system of claim 1, wherein the at least one optical diffuser comprises at least one of a fabric optical diffuser or a PVC optical diffuser.

25. The acoustic lighting system of claim 1, wherein the at least one acoustic aperture is configured for mounting of additional ceiling elements.

26. The acoustic lighting system of claim 25, wherein additional ceiling elements comprise at least one of track lights, spot lights, wall washer lights, linear lights, camera, fire sprinkler heads, heating and air conditioning ducts, microphones, or wireless radio access points.

27. The acoustic lighting system of claim 1, further comprising, extending from the luminaire enclosure, means for suspending the lighting system from a wall or ceiling.

28. The acoustic lighting system of claim 1, further comprising, disposed on the luminaire enclosure, means for attaching the lighting system to a wall or ceiling.

\* \* \* \* \*